US011696203B2

United States Patent
Basu Mallick et al.

(10) Patent No.: US 11,696,203 B2
(45) Date of Patent: *Jul. 4, 2023

(54) HANDOFF PROCEDURE IN A MOBILE COMMUNICATION SYSTEM

(71) Applicant: Panasonic Intellectual Property Corporation of America, Torrance, CA (US)

(72) Inventors: Prateek Basu Mallick, Hessen (DE); Joachim Loehr, Hessen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/726,277

(22) Filed: Apr. 21, 2022

(65) Prior Publication Data
US 2022/0248295 A1 Aug. 4, 2022

Related U.S. Application Data

(63) Continuation of application No. 17/086,048, filed on Oct. 30, 2020, now Pat. No. 11,343,746, which is a (Continued)

(51) Int. Cl.
H04W 36/30 (2009.01)
H04W 36/00 (2009.01)
(Continued)

(52) U.S. Cl.
CPC ....... *H04W 36/30* (2013.01); *H04W 36/0005* (2013.01); *H04W 36/0072* (2013.01); *H04W 74/006* (2013.01); *H04W 74/0833* (2013.01)

(58) Field of Classification Search
CPC ............. H04W 36/30; H04W 36/0005; H04W 36/0072; H04W 74/006; H04W 74/0833
(Continued)

(56) References Cited

U.S. PATENT DOCUMENTS 8,891,101 B2 11/2014 Puttonen et al.
9,155,014 B2 10/2015 Tenny et al.
(Continued)

FOREIGN PATENT DOCUMENTS

CN 101931966 A 12/2010
CN 102131207 A 7/2011
(Continued)

OTHER PUBLICATIONS

3GPP TS 36.300 V9.10.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," Dec. 2012, 174 pages.
(Continued)

*Primary Examiner* — Gbemileke J Onamuti
(74) *Attorney, Agent, or Firm* — Seed IP Law Group LLP

(57) ABSTRACT

The invention relates to an improved handover procedure for a mobile terminal. Under control of the target base station, the mobile terminal is to perform a handoff to a target base station, wherein it is to be configured for communication with the target base station via a target radio cell comprising a downlink carrier and an uplink carrier. The mobile terminal receives a handoff command message for the handoff to the target base station including a handoff execution condition as trigger for executing handoff to the target base station. Then, the mobile terminal determines, based on the received handoff execution condition, whether or not the mobile terminal is to trigger execution of the handoff to the target base station. In case the mobile terminal determines that it is to trigger execution of the handoff to the target base station, the mobile terminal executes the handoff to the target base station.

11 Claims, 13 Drawing Sheets

Related U.S. Application Data continuation of application No. 16/672,136, filed on Nov. 1, 2019, now Pat. No. 10,863,408, which is a continuation of application No. 16/218,244, filed on Dec. 12, 2018, now Pat. No. 10,536,890, which is a continuation of application No. 15/855,841, filed on Dec. 27, 2017, now Pat. No. 10,200,931, which is a continuation of application No. 14/908,522, filed as application No. PCT/EP2014/066263 on Jul. 29, 2014, now Pat. No. 9,888,424.

(51) Int. Cl.
    *H04W 74/00*     (2009.01)
    *H04W 74/08*     (2009.01)
(58) Field of Classification Search
    USPC ......................................................... 370/436
    See application file for complete search history.

(56)                References Cited

U.S. PATENT DOCUMENTS

| | | | |
|---|---|---|---|
| 9,591,545 | B2 | 3/2017 | Tamura et al. |
| 2007/0230400 | A1 | 10/2007 | Kuchibhotla et al. |
| 2009/0111468 | A1 | 4/2009 | Burgess et al. |
| 2010/0124172 | A1 | 5/2010 | Tenny et al. |
| 2010/0124203 | A1 | 5/2010 | Tenny et al. |
| 2010/0124918 | A1 | 5/2010 | Agashe et al. |
| 2010/0173632 | A1 | 7/2010 | Kitaji |
| 2010/0178920 | A1 | 7/2010 | Kitazoe et al. |
| 2011/0058529 | A1 | 3/2011 | Uemura |
| 2011/0124340 | A1 | 5/2011 | Puttonen et al. |
| 2011/0244863 | A1 | 10/2011 | Matsuo et al. |
| 2012/0172042 | A1 | 7/2012 | Drevon et al. |
| 2012/0276946 | A1 | 11/2012 | Sung et al. |
| 2012/0309398 | A1 | 12/2012 | Watanabe |
| 2014/0024376 | A1 | 1/2014 | Suga |
| 2014/0126545 | A1 | 5/2014 | Tamura et al. |
| 2014/0128058 | A1 | 5/2014 | Ji et al. |

FOREIGN PATENT DOCUMENTS

| | | |
|---|---|---|
| CN | 102209338 A | 10/2011 |
| CN | 102217354 A | 10/2011 |
| CN | 102217362 A | 10/2011 |
| CN | 102217375 A | 10/2011 |
| CN | 102415149 A | 4/2012 |
| CN | 102648650 A | 8/2012 |
| EP | 2 244 504 A1 | 10/2010 |
| JP | 2012-509619 A | 4/2012 |
| WO | 2008/023204 A1 | 2/2008 |
| WO | 2009/020109 A1 | 12/2009 |
| WO | 2010/057127 A1 | 5/2010 |
| WO | 2012/127600 A1 | 7/2014 |
| WO | 2013/024574 A1 | 3/2015 |

OTHER PUBLICATIONS

3GPP TS 36.300 V11.5.0, 3rd Generation Partnership Project; Technical Specification Group Radio Access Network; Evolved Universal Terrestrial Radio Access (E-UTRA) and Evolved Universal Terrestrial Radio Access Network (E- UTRAN); Overall description; Stage 2 (Release 11 ), Mar. 2013, 209 pages.
3GPP TS 36.331 V11.4.0, 3rd Generation Partnership Project; Technical Specification Group Radio Access Network; Evolved Universal Terrestrial Radio Access (E-UTRA); Radio Resource Control (RRC); Protocol specification (Release 11), Jun. 2013, 346 pages.
3GPP TR 36.839 V11.1.0, 3rd Generation Partnership Project; Technical Specification Group Radio Access Network; Evolved Universal Terrestrial Radio Access (E-UTRA); Mobility enhancements in heterogeneous networks (Release 11). Dec. 2012, 53 pages.
3GPP TR 36.842 V0.2.0, 3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12), May 2013, 38 pages.
3GPP TR 36.932 V12.1.0, 3rd Generation Partnership Project; Technical Specification Group Radio Access Network; Scenarios and requirements for small cell enhancements for E-UTRA and E-UTRAN (Release 12), Mar. 2013, 14 pages.
Alcatel-Lucent, "Vendor interoperable mobility in HetNet scenarios," R3-131073 (revision of R3-130814), Agenda item: 10.1.1, 3GPP TSG RAN WG3 Meeting #80, Fukuoka, Japan, May 20-24, 2013, 5 pages.
CATT, "Adjusting handover parameters according to the handover type," R2-130111, Agenda Item: 7.1, 3GPP TSG RAN WG2 Meeting #81, St. Julian's, Malta, Jan. 28-Feb. 1, 2013, 6 pages.
Chinese Office Action, dated Nov. 30, 2018, for Chinese Application No. 201480052060.6, 25 pages, (with English Abstract).
Communication pursuant to Article 94(3) EPC, dated Mar. 31, 2017, for corresponding European Application No. 13 178 842.4-1857, 5 pages.
Email Discussion Rapporteur (Motorola), "[66#9] LTE-UMTS: Inbound mobility to CSG cell from LTE cell," R2-093920, Agenda Item: 4.2.1.1, 3GPP TSG-RAN WG2#66bis, Los Angeles, U.S.A., Jun. 29-Jul. 3, 2009, 29 pages.
ETSI, "[preR3#68—SON] Discussion kick-off," LISTSERV—3GPP_TSG_RAN_WG3 Archives—LIST.ETSI.ORG, Apr. 2010, 11 pages.
ETSI, "[70#10] LTE CA: Information provided to target eNB at handover," LISTSERV—3GPP_TSG_RAN_WG2 Archives—LIST.ETSI.ORG, Jun. 2010, 4 pages.
ETSI, "[#07 Post-RAN#70: Event-triggered inter-RAT cell load reporting—R3-103658] (ALU)," LISTSERV—3GPP_TSG_RAN_WG3 Archives—LIST.ETSI.ORG, Nov. 2010, 10 pages.
ETSI, "2nd [73#43] LTE: Additional RLF Report Contents," LISTSERV—3GPP_TSG_RAN_WG2 Archives—LIST.ETSI.ORG, Apr. 2011, 6 pages.
European Office Action dated Aug. 2, 2018 for related European Patent Application No. 13 178 842.4-1215 (7 pages).
Extended European Search Report dated Jan. 22, 2014, for corresponding EP Application No. 13178842.4-1857, 6 pages.
International Search Report dated Dec. 1, 2014, for corresponding International Application No. PCT/ EP2014/066263, 4 pages.
Huawei, "Update of the TR for the LTE-HRPD Inter RAT SON SI," R3-131132, Agenda item: 11, 3GPP TSG-RAN WG3, Meeting #80, Fukuoka, Japan, May 20-24, 2013, 12 pages.
LG Electronics Inc., "Delta CC configuration at handover," R2-103209, Agenda item: 7.1.5, 3GPP TSG-RAN2 Meeting #70, Montreal, Canada, May 10-May 14, 2010, 2 pages.
Office Action dated May 10, 2018 for Chinese Application No. 2014800520606 (with translation, 26 pages).
Office Action dated Jun. 5, 2018 for Japanese Application No. 2016-530492 (with translation, 17 pages).
New Postcom, "Discussions on short stay issues," R3-130900, Agenda item: 10.3.2, 3GPP TSG RAN WG3 Meeting #80, Fukuoka, Japan, May 20-24, 2013, 4 pages.
Nokia Siemens Networks, "Timer based approach for detection of misconfigured threshold of a dual threshold event," R3-130985, 3GPP TSG RAN WG3 Meeting #80, Fukuoka, Japan, May 20-24, 2013, 4 pages.

HANDOFF PROCEDURE IN A MOBILE COMMUNICATION SYSTEM

FIELD OF THE INVENTION

The invention relates to methods for performing a handoff of a mobile terminal to a target base station. As part of the handoff, the mobile terminal is to be configured for communication with the target base station via a target radio cell comprising a downlink and an uplink carrier. The invention also provides the mobile terminal and the base station for performing the methods described herein.

TECHNICAL BACKGROUND

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall architecture is shown in FIG. 1 and a more detailed representation of the E-UTRAN architecture is given in FIG. 2. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Handover Procedure

The term Connected Mode Mobility refers to various procedures e.g. handover procedure. In particular, a 3GPP LTE handover procedure is specified in 3GPP TS 36.300: "Evolved Universal Terrestrial Radio Access (E-UTRA) and Evolved Universal Terrestrial Radio Access Network (E-UTRAN); Overall description; Stage 2", version 11.5.0, section 10.1.2 available at http//www.3gpp.org and incorporated herein by reference. Further, details of the handover procedure relating to RRC connection reconfiguration are defined in TS 36.331: "Evolved Universal Terrestrial Radio Access (E-UTRA); Radio Resource Control (RRC); Protocol specification)", version 11.4.0 section 5.3.5 available at http//www.3gpp.org and incorporated herein by reference.

The Intra-E-UTRAN-Access Mobility Support for UEs in CONNECTED Mode handles all necessary steps for handover procedures, like processes that precede the final handover, HO, decision on the source network side (control and evaluation of UE and eNB measurements taking into account certain UE specific area restrictions), preparation of resources on the target network side, commanding the UE to the new radio resources and finally releasing resources on the (old) source network side.

The intra E-UTRAN handover, HO, of a UE in RRC_CONNECTED state is a UE-assisted network-controlled HO, with HO preparation signalling in E-UTRAN:

Part of the HO command comes from the target eNB and is transparently forwarded to the UE by the source eNB;

To prepare the HO, the source eNB passes all necessary information to the target eNB.

Both the source eNB and UE keep some context (e.g. C-RNTI) to enable the return of the UE in case of HO failure;

UE accesses the target cell via RACH following a contention-free procedure using a dedicated RACH preamble or following a contention-based procedure if dedicated RACH preambles are not available:

the UE uses the dedicated preamble until the handover procedure is finished (successfully or unsuccessfully);

If the RACH procedure towards the target cell is not successful within a certain time, the UE initiates radio link failure recovery using the best cell;

The preparation and execution phase of the HO procedure is performed without EPC involvement, i.e. preparation messages are directly exchanged between the eNBs. The release of the resources at the source side during the HO completion phase is triggered by the eNB. The figure below depicts the basic handover scenario; only the first few steps are explained that are more relevant from this invention perspective:

Below a more detailed description of the intra-MME/Serving Gateway handover, HO, procedure illustrated in FIG. 3 is given where preceeding numbers refer to corresponding steps in the sequence diagram of the figure:

0 The UE context within the source eNB contains information regarding roaming restrictions which were provided either at connection establishment or at the last TA update.

1 The source eNB configures the UE measurement procedures according to the area restriction information. Measurements provided by the source eNB may assist the function controlling the UE's connection mobility.

2 A MEASUREMENT REPORT is triggered and sent to the eNB.

3 The source eNB makes decision based on MEASUREMENT REPORT and RRM information to hand off the UE.

4 The source eNB issues a HANDOVER REQUEST message to the target eNB passing necessary information to prepare the HO at the target side (UE X2 signalling context reference at source eNB, UE S1 EPC signalling context reference, target cell ID, KeNB*, RRC context including the C-RNTI of the UE in the source eNB, AS-configuration, E-RAB context and physical layer ID of the source cell+short MAC-I for possible RLF recovery). UE X2/UE S1 signalling references enable the target eNB to address the source eNB and the EPC. The E-RAB context includes necessary RNL and TNL addressing information, and QoS profiles of the E-RABs.

5 Admission Control may be performed by the target eNB dependent on the received E-RAB QoS information to increase the likelihood of a successful HO, if the resources can be granted by target eNB. The target eNB configures the required resources according to the received E-RAB QoS information and reserves a C-RNTI and optionally a RACH preamble. The AS-configuration to be used in the target cell can either be specified independently (i.e. an "establishment") or as a delta compared to the AS-configuration used in the source cell (i.e. a "reconfiguration").

6 The target eNB prepares HO with L1/L2 and sends the HANDOVER REQUEST ACKNOWLEDGE to the source eNB. The HANDOVER REQUEST ACKNOWLEDGE message includes a transparent container to be sent to the UE as an RRC message to perform the handover. The container includes a new C-RNTI, target eNB security algorithm identifiers for the selected security algorithms, may include a dedicated RACH preamble, and possibly some other parameters i.e. access parameters, SIBs, etc. The HANDOVER REQUEST ACKNOWLEDGE message may also include RNL/TNL information for the forwarding tunnels, if necessary.

NOTE: As soon as the source eNB receives the HANDOVER REQUEST ACKNOWLEDGE, or as soon as the transmission of the handover command is initiated in the downlink, data forwarding may be initiated.

Steps 7 to 16 provide means to avoid data loss during HO and are further detailed in 10.1.2.1.2 and 10.1.2.3.

7 The target eNB generates the RRC message to perform the handover, i.e RRCConnectionReconfiguration message including the mobilityControlInformation, to be sent by the source eNB towards the UE. The source eNB performs the necessary integrity protection and ciphering of the message. The UE receives the RRCConnectionReconfiguration message with necessary parameters (i.e. new C-RNTI, target eNB security algorithm identifiers, and optionally dedicated RACH preamble, target eNB SIBs, etc.) and is commanded by the source eNB to perform the HO. The UE does not need to delay the handover execution for delivering the HARQ/ARQ responses to source eNB.

8 The source eNB sends the SN STATUS TRANSFER message to the target eNB to convey the uplink PDCP SN receiver status and the downlink PDCP SN transmitter status of E-RABs for which PDCP status preservation applies (i.e. for RLC AM). The uplink PDCP SN receiver status includes at least the PDCP SN of the first missing UL SDU and may include a bit map of the receive status of the out of sequence UL SDUs that the UE needs to retransmit in the target cell, if there are any such SDUs. The downlink PDCP SN transmitter status indicates the next PDCP SN that the target eNB shall assign to new SDUs, not having a PDCP SN yet. The source eNB may omit sending this message if none of the E-RABs of the UE shall be treated with PDCP status preservation.

9 After receiving the RRCConnectionReconfiguration message including the mobilityControlInformation, UE performs synchronization to target eNB and accesses the target cell via RACH, following a contention-free procedure if a dedicated RACH preamble was indicated in the mobilityControlInformation, or following a contention-based procedure if no dedicated preamble was indicated. UE derives target eNB specific keys and configures the selected security algorithms to be used in the target cell.

10 The target eNB responds with UL allocation and timing advance.

11 When the UE has successfully accessed the target cell, the UE sends the RRCConnectionReconfigurationComplete message (C-RNTI) to confirm the handover, along with an uplink Buffer Status Report, whenever possible, to the target eNB to indicate that the handover procedure is completed for the UE. The target eNB verifies the C-RNTI sent in the RRCConnectionReconfigurationComplete message. The target eNB can now begin sending data to the UE.

12 The target eNB sends a PATH SWITCH REQUEST message to MME to inform that the UE has changed cell.

13 The MME sends a MODIFY BEARER REQUEST message to the Serving Gateway.

14 The Serving Gateway switches the downlink data path to the target side. The Serving gateway sends one or more "end marker" packets on the old path to the source eNB and then can release any U-plane/TNL resources towards the source eNB.

15 The Serving Gateway sends a MODIFY BEARER RESPONSE message to MME.

16 The MME confirms the PATH SWITCH REQUEST message with the PATH SWITCH REQUEST ACKNOWLEDGE message.

17 By sending the UE CONTEXT RELEASE message, the target eNB informs success of HO to source eNB and triggers the release of resources by the source eNB. The target eNB sends this message after the PATH SWITCH REQUEST ACKNOWLEDGE message is received from the MME.

18 Upon reception of the UE CONTEXT RELEASE message, the source eNB can release radio and C-plane related resources associated to the UE context. Any ongoing data forwarding may continue.

When an X2 handover is used involving HeNBs and when the source HeNB is connected to a HeNB GW, a UE CONTEXT RELEASE REQUEST message including an explicit GW Context Release Indication is sent by the source HeNB, in order to indicate that the HeNB GW may release of all the resources related to the UE context.

Radio Link Failure

Radio Link Failures, RLF, have in the past been widely studied and characterized. Specifically, in the context of 3GPPP LTE, two different phases govern the behavior associated to radio link failure.

A First Phase can be characterized as follows it is starts upon detection of a radio problem; it leads to radio link failure; it corresponds to no UE-based mobility; it is distinguishable based on timer or other (e.g. counting) criteria ($T_1$). A Second Phase can be characterized as follows: it is started upon radio link failure detection or handover failure; it leads to the UE switching to the RRC_IDLE state; it corresponds to UE-based mobility; and it is distinguishable based on timer ($T_2$).

In the table below, it is described how mobility is handled with respect to radio link failure.

| Cases | First Phase | Second Phase | T2 expired |
| --- | --- | --- | --- |
| UE returns to the same cell | Continue as if no radio problems occurred | Activity is resumed by means of explicit signaling between UE and eNB | Go via RRC_IDLE |
| UE selects a different cell from the same eNB | N/A | Activity is resumed by means of explicit signaling between UE and eNB | Go via RRC_IDLE |
| UE selects a cell of a prepared eNB (NOTE) | N/A | Activity is resumed by means of explicit signaling between UE and eNB | Go via RRC_IDLE |
| UE selects a cell of a different eNB that is not prepared (NOTE) | N/A | Go via RRC_IDLE | Go via RRC_IDLE |

(NOTE):
a prepared eNB is an eNB which has admitted the UE during an earlier executed HO preparation phase.

In the Second Phase, in order to resume activity and avoid going via RRC_IDLE when the UE returns to the same cell or when the UE selects a different cell from the same eNB, or when the UE selects a cell from a different eNB, the following procedure applies:

The UE stays in RRC_CONNECTED;

The UE accesses the cell through the random access procedure;

The UE identifier used in the random access procedure for contention resolution (i.e. C-RNTI of the UE in the cell where the RLF occurred+physical layer identity of that cell+short MAC-I based on the keys of that cell) is used by the selected eNB to authenticate the UE and check whether it has a context stored for that UE:

If the eNB finds a context that matches the identity of the UE, it indicates to the UE that its connection can be resumed;

If the context is not found, RRC connection is released and UE initiates procedure to establish new RRC connection. In this case UE is required to go via RRC_IDLE.

The radio link failure procedure applies also for RNs, with the exception that the RN is limited to select a cell from its DeNB cell list. Upon detecting radio link failure, the RN discards any current RN subframe configuration (for communication with its DeNB), enabling the RN to perform normal contention-based RACH as part of the re-establishment. Upon successful re-establishment, an RN subframe configuration can be configured again using the RN reconfiguration procedure.

If the recovery attempt in the second phase fails, the details of the RN behavior in RRC_IDLE to recover an RRC connection are up to the RN implementation.

Radio Link Failure is described in detail in 3GPP TS 36.300: "Evolved Universal Terrestrial Radio Access (E-UTRA) and Evolved Universal Terrestrial Radio Access Network (E-UTRAN); Overall description; Stage 2", version 11.5.0, section 10.1.6 available at http//www.3gpp.org and incorporated herein by reference.

Technology Areas

This invention can be used as a solution for improving mobility robustness in many technologies including:

Heterogeneous Networks

A Heterogeneous network is generally referred in this invention for deployment scenarios where the neighboring cells differ (sometimes substantially) in transmit power/cell range/size. The bigger cell/eNB (in transmit power/cell range/size) is generally referred to as Macro (or Master, Main, Aggressor etc.) and the small cell/eNB is referred to as Small (or Pico, Secondary, Victim etc.). This invention further does not distinguishes within e.g. Small Cells/eNBs i.e. Pico and Small eNB are treated/named in a similar way irrespective of their definition (and difference in real transmit power/size) elsewhere—this invention applies for all scenarios with mixed cell/eNB deployments.

Small Cells

Explosive demands for mobile data are driving changes in how mobile operators will need to respond to the challenging requirements of higher capacity and improved Quality of user Experience (QoE). Currently, fourth generation wireless access systems using Long Term Evolution (LTE) are being deployed by many operators worldwide in order to offer faster access with lower latency and more efficiency than 3G/3.5G system. Nevertheless, the anticipated future traffic growth is so tremendous that there is a vastly increased need for further network densification to handle the capacity requirements, particularly in high traffic areas (hot spot areas) that generate the highest volume of traffic. Network densification—increasing the number of network nodes, thereby bringing them physically closer to the user terminals—is a key to improving traffic capacity and extending the achievable user-data rates of a wireless communication system.

In addition to straightforward densification of a macro deployment, network densification can be achieved by the deployment of complementary low-power nodes respectively small cells under the coverage of an existing macronode layer. In such a heterogeneous deployment, the low-power nodes provide very high traffic capacity and very high user throughput locally, for example in indoor and outdoor hotspot positions. Meanwhile, the macro layer ensures service availability and QoE over the entire coverage area. In other words, the layer containing the low-power nodes can also be referred to as providing local-area access, in contrast to the wide-area-covering macro layer.

The installation of low-power nodes respectively small cells as well as heterogeneous deployments has been possible since the first release of LTE. In this regard, a number of solutions have been specified in recent releases of LTE (i.e., Release-10/11). More specifically, these releases introduced additional tools to handle inter-layer interference in heterogeneous deployments. In order to further optimize performance and provide cost/energy-efficient operation, small cells require further enhancements and in many cases need to interact with or complement existing macro cells. Such solutions will be investigated during the further evolution of LTE—Release 12 and beyond. In particular further enhancements related to low-power nodes and heterogeneous deployments will be considered under the umbrella of the new Rel-12 study item (SI) "Study on Small Cell Enhancements for E-UTRA and E-UTRAN". Some of these activities will focus on achieving an even higher degree of interworking between the macro and low-power layers, including different forms of macro assistance to the low-power layer and dual-layer connectivity. Dual connectivity implies that the device has simultaneous connections to both macro and low-power layers.

Some deployment scenarios assumed in this study item on small cell enhancements will be discussed below. In the following scenarios, the backhaul technologies categorized as non-ideal backhaul in TR 36.932 are assumed.

Both ideal backhaul (i.e., very high throughput and very low latency backhaul such as dedicated point-to-point connection using optical fiber) and non-ideal backhaul (i.e., typical backhaul widely used in the market such as xDSL, microwave, and other backhauls like relaying) should be studied. The performance-cost trade-off should be taken into account.

A categorization of non-ideal backhaul based on operator inputs is listed in the table below:

| Backhaul Technology | Latency (One way) | Throughput | Priority (1 is the highest) |
|---|---|---|---|
| Fiber Access 1 | 10-30 ms | 10 M-10 Gbps | 1 |
| Fiber Access 2 | 5-10 ms | 100-1000 Mbps | 2 |
| Fiber Access 3 | 2-5 ms | 50 M-10 Gbps | 1 |
| DSL Access | 15-60 ms | 10-100 Mbps | 1 |
| Cable | 25-35 ms | 10-100 Mbps | 2 |
| Wireless Backhaul | 5-35 ms | 10 Mbps-100 Mbps typical, maybe up to Gbps range | 1 |

Fiber access which can be used to deploy Remote Radio Heads (RRHs) is not assumed in this study. HeNBs are not precluded, but not distinguished from Pico eNBs in terms of deployment scenarios and challenges even though the transmission power of HeNBs is lower than that of Pico eNBs. The following 3 scenarios are considered.

Scenario #1 is illustrated in FIG. 5 and is the deployment scenario where macro and small cells on the same carrier frequency (intra-frequency) are connected via a non-ideal backhaul. User are distributed both for outdoor and indoor.

Scenario #2 is illustrated in FIGS. 6 and 7 and refers to a deployment scenario where macro and small cells on different carrier frequencies (inter-frequency) are connected via a non-ideal backhaul. User are distributed both for outdoor and indoor. There are essentially two different scenarios #2, referred herein as 2a and 2b, the difference being that in scenario 2b an indoor small cell deployment is considered.

Scenario #3 is illustrated in FIG. 8 and refers to a deployment scenario where only small cells on one or more carrier frequencies are connected via a non-ideal backhaul link.

Depending on the deployment scenario, different challenges/problems exist which need to be further investigated. During the study item phase such challenges have been identified for the corresponding deployment scenarios and captured in TS 36.842; more details on those challenges/problems can be found there.

In order to resolve the identified challenges which are described in section 5 of TS36.842, the following design goals are taken into account for this study in addition to the requirements specified in TR 36.932.

In terms of mobility robustness:
For UEs in RRC_CONNECTED, Mobility performance achieved by small cell deployments should be comparable with that of a macro-only network.

In terms of increased signaling load due to frequent handover:
Any new solutions should not result in excessive increase of signaling load towards the Core Network. However, additional signaling and user plane traffic load caused by small cell enhancements should also be taken into account.

In terms of improving per-user throughput and system capacity:
Utilizing radio resources across macro and small cells in order to achieve per-user throughput and system capacity similar to ideal backhaul deployments while taking into account QoS requirements should be targeted.

Dual Connectivity

One promising solution to the problems which are currently under discussion in 3GPP RAN working groups is the so-called "dual connectivity" concept. The term "dual connectivity" is used to refer to an operation where a given UE consumes radio resources provided by at least two different network nodes connected with a non-ideal backhaul. Essentially, the UE is connected with both a macro cell (macro eNB) and small cell (secondary or small eNB). Furthermore, each eNB involved in dual connectivity for a UE may assume different roles. Those roles do not necessarily depend on the eNB's power class and can vary among UEs.

Since the study Item is currently at a very early stage, details on the dual connectivity are not decided yet. For example the architecture has not been agreed on yet. Therefore, many issues/details, e.g. protocol enhancements, are still open currently. FIG. 9 shows an exemplary architecture for dual connectivity. It should be only understood as one potential option; the invention is not limited to this specific network/protocol architecture but can be applied generally. The following assumptions on the architecture are made here:

Per bearer level decision where to serve each packet, C/U plane split
As an example UE RRC signaling and high QoS data such as VoLTE can be served by the Macro cell, while best effort data is offloaded to the small cell.
No coupling between bearers, so no common PDCP or RLC required between the Macro cell and small cell
Looser coordination between RAN nodes
SeNB has no connection to S-GW, i.e. packets are forwarded by MeNB
Small Cell is transparent to CN.

Regarding the last two bullet points, it should be noted that it's also possible that SeNB is connected directly with the S-GW, i.e. S1-U is between S-GW and SeNB. Essentially there are three different options w.r.t the bearer mapping/splitting:

Option 1: S1-U also terminates in SeNB; depicted in FIG. 10a
Option 2: S1-U terminates in MeNB, no bearer split in RAN; depicted in FIG. 10b
Option 3: S1-U terminates in MeNB, bearer split in RAN; depicted in FIG. 10c FIG. 10a-c depict those three options taking the downlink direction for the U-Plane data as an example. For explanation purpose, option 2 is mainly assumed for this application, and is the basis for FIG. 9 too.

One of the main aims in SCE (Small Cell Enhancement) study item and generally in Heterogeneous deployment is that the offloading of UEs to the small/Pico Cells are maximized which means that more and more UEs are offloaded to small/Pico Cells as well as the time that the UEs stay in the small/Pico Cells (before their connection moving out to a Macro Cells) is maximized i.e. the ToS (Time of Stay) maximization is an important aim in the Small Cell Enhancement and generally in Heterogeneous deployment.

Shortcomings with Heterogeneous Deployment

A state where the UE is known to the network at the Access Stratum level is generally referred to as Connected Mode. In this respect, Connected Mode mobility typically indicates when the UE moves from one location to the other such that the signal condition in the source area is getting weaker and better in the destination area. The Connected Mode mobility is realized by means of Handovers. In Heterogeneous deployment scenarios the source/destination cells are typically of different size/transmit power.

It has been widely acknowledged that Connected Mode Mobility in Heterogeneous deployment scenarios is not as robust as desired and that handover failures, HOF, or radio link failures RLF have recently been put under technical review; for a detailed description it is refer to 3GPP TR 36.839: ""Evolved Universal Terrestrial Radio Access (E-UTRA); Mobility enhancements in heterogeneous networks" version 11.1.0, sections 5.2 and 5.4 available at http//www.3gpp.org and incorporated herein by reference.

The mobility is especially weak when the UE moves out of the Small/Pico cell towards the Macro cell. This is mainly so since the radio condition in the Small/Pico cell's edge is weaker and interfered by the Macro cells transmissions. In these situations it is difficult to successfully receive the handover command by the UE.

Some kind of preventive solutions do exist. The preventive solutions in the state-of-the-art are quite complex and in some cases not completely clear how these will work; for example:

Repetition of HO CMD message by cells other than the source cell (RRC Diversity) e.g. the handover target cell requires that the UE be able to receive from 2 different cells [Simultaneous or One by one] and it will be unattractive and complex since:
Simultaneous reception requires dual connection capability which may not be available with all UEs and dual connectivity itself may not be a desirable solution in some deployment scenarios (e.g. in Scenario 1 of SCE).
One by one (first by source and then by target): In this case, it is not clear when and how will the UE know, which C-RNTI to use, which SRB configuration to use etc. when trying to receive the HO CMD from the Target Cell.
Requiring multiple (interfering) neighbor cells to coordinate/blank their transmission when the HO CMD is to be sent/received to/by the UE. However, this alone is not sufficient for non ideal ABS coordination among macro cells and larger CRE bias cases.

One of the ways to achieve "prevention" is by sending the HO CMD early by the source cell (while the Radio Conditions are sufficiently good); this suffers from:
- Minimizing offloading gains (the UE should stay on the small cell for as long as possible)
- Un-necessary handovers/mobility/signaling
- More HO interruption Other possible line of solution for improving the Mobility Robustness in heterogeneous deployment could be curative in nature. For example, if the mobility/handover fails (e.g. HOF, RLF happens) then how to minimize the damages (e.g. by faster reestablishments). The curative methods are not sufficient since they lead to more complexity (in enhancing Re-establishment) and still cause some jitters.

Another problem in Heterogeneous deployment is the UE battery consumption in:
1) Finding/discovering the small cell layer since these small cells may not be ubiquitously present everywhere.
2) Measuring 2 source frequencies while in dual connectivity which might be unnecessary sometimes.

Improving UE battery life in Heterogeneous deployment is referred to as the second problem in the remaining text.

SUMMARY OF THE INVENTION

One object of the invention is to provide an improved method for performing a handoff of a mobile terminal to a target base station. More specifically, in performing the handoff the mobile terminal remains under the control of the target base station, while at the same time robustness and reliability of the decision to handoff to the target base station is improved.

The object is solved by the subject-matter of the independent claims. Advantageous embodiments are subject to the dependent claims.

For the first aspect of the invention, it is assumed that the mobile terminal is configured to receive a handoff command message for the handoff to the target base station. As part of the handoff, the mobile terminal is to be configured for communication with the target base station via a target radio cell comprising a downlink carrier and an uplink carrier. The target base station controls configuration of the mobile terminal.

Conventionally, a handoff procedure implies that the mobile terminal is configured for communication with a source base station via a source radio cell. In this respect, the mobile terminal receives the handoff command message from the source radio cell via a downlink carrier of the source radio cell. However, the invention is not limited in this respect.

The mobile terminal may also be configured to receive the handoff command message from a network entity of different a radio access technology, for instance a WIFI access point, a Bluetooth gateway or a WIMAX router. Irrespective of the radio access technology, it is important to note that the invention is performed under the control of the target base station. Accordingly, it is the target base station which generates the handoff command message to be received by the mobile terminal.

Upon receipt of a handoff command message, the mobile terminal of the invention refers to the handoff execution condition additionally included in the handoff command message for information on the execution of the handoff to the target base station. Accordingly, the handoff execution condition included in the handoff command message can be understood as a trigger for the execution of the handoff. In this respect, an additional step of evaluating the handoff execution condition is performed before the handoff to the target message is carried out.

In more detail, the handoff execution condition includes a time trigger for the execution of the handoff to the target base station. For this purpose, the mobile terminal determines, based on the received handoff execution condition included in the handoff command message, whether or not the mobile terminal is to trigger execution of the handoff to the target base station. Moreover, since the handoff execution condition may delay or may even prevent the mobile terminal from executing handoff to the target base station, the handoff execution condition cannot be assumed to result in a one-way-street situation wherein the mobile terminal immediately executes the handoff to the target base station.

In other words, due to the additional determination of whether or not the handoff execution condition is met, the point in time when the mobile terminal receives the handoff command message is separate from (e.g. spaced apart from) the point in time when the mobile terminal executes the handoff to the target base station.

This separation is advantageous in view of an optimal timing of the handoff: The mobile terminal may delay or defer execution of the handoff to the target base station up to a point in time where its connectivity (e.g. to the source radio cell) is lost. In this respect, a handoff to the target base station may be delayed or deferred up to a point in time where reception of the handoff command message would no longer be possible. Accordingly, the invention strives to prevent from too early handoffs by solving the problem of too late handoffs (i.e. lost handoff command messages due to poor radio conditions in the source radio cell).

Further, the additional determination of whether or not the handoff execution condition is met leaves the mobile terminal with an additional degree of freedom for it to determine an ideal timing of the execution of the handoff to the mobile terminal.

However, this additional degree of freedom may be well balanced in that the handoff command message includes an indication of a specific handoff execution condition which is to trigger execution of the handoff to the target base station. In other words, by specifying the handoff execution condition included in the handoff command message, the mobile terminal under control of the target base station executes handoff in a manner that is predictable time-wise to the target bases station.

In more detail, in case the mobile terminal determines that it is to trigger execution of the handoff to the target base station, the mobile terminal executes the handoff to the target base station by (a) performing a random access channel, RACH, procedure with the target base station to thereby time align the uplink carrier of the target radio cell, and (b) transmitting to the target base station a handoff complete message. Thereby, the mobile terminal indicates completion of the handoff to the target base station including indicating completion of configuration of the mobile terminal for communication with the target base station via the target radio cell.

According to an embodiment in line with the first aspect of the invention, a method is suggested for performing a handoff of a mobile terminal to a target base station, wherein the mobile terminal is to be configured, under control of the target base station, for communication with the target base station via a target radio cell comprising a downlink carrier and an uplink carrier. The mobile terminal receives a handoff command message for the handoff to the target base station including a handoff execution condition as trigger for executing handoff to the target base station. Then, the mobile terminal determines, based on the received handoff execution condition included in the handoff command message, whether or not the mobile terminal is to trigger execution of the handoff to the target base station. In case the mobile terminal determines that it is to trigger execution of the handoff to the target base station, the mobile terminal executes the handoff to the target base station (a) by performing a random access channel, RACH, procedure with the target base station to thereby time align the uplink carrier of the target radio cell, and (b) by transmitting to the target base station a handoff complete message thereby indicating completion of the handoff to the target base station including completion of configuration of the mobile terminal for communication with the target base station via the target radio cell.

According to a more detailed embodiment of the method for performing the handoff, the mobile terminal, prior to receiving the handoff command message, is configured for communication with a source base station via a source radio cell; and the mobile terminal receives the handoff command message from the source base station via a downlink carrier of the source radio cell; and after receiving the handoff command message the mobile terminal detaches from the source radio cell thereby stopping communication with the source base station.

According to another more detailed embodiment of the method for performing the handoff, in case the mobile terminal does not, within a first pre-configured period of time, determine that it is to trigger execution of the handoff to the target base station, the mobile terminal discards the received handoff command message.

According to further more detailed embodiment of the method for performing the handoff, the received handoff command message includes a handoff validity timer, and the mobile terminal further re-configures the first pre-configured period of time based on the handoff validity timer.

According to yet another more detailed embodiment of the method for performing the handoff, the handoff execution condition, included in the received handoff command message, corresponds to a timer value; and the mobile terminal further determines whether or not a timer with the timer value has expired; wherein, upon expiration of the timer with the timer value, the mobile terminal is to trigger execution of the handoff to the target base station.

According to an even further more detailed embodiment of the method for performing the handoff, the handoff execution condition, included in the received handoff command message, corresponds to an indication to trigger execution of the handoff based on pre-configured threshold values for the signal strength or signal quality of a source and/or target radio cell; and the mobile terminal further determines whether or not the respective signal strength or signal quality of the source radio cell falls below one of the pre-configured threshold values and/or the respective signal strength or signal quality of target radio cell rises above another of the pre-configured threshold values; wherein, upon the respective signal strength or signal quality having fallen below the one of the pre-configured threshold values and/or having risen above the other of the pre-configured threshold values, the mobile terminal is to trigger execution of the handoff to the target base station.

According to another more detailed embodiment of the method for performing the handoff, the handoff execution condition, included in the received handoff command message, corresponds to at least one threshold value for the signal strength or signal quality of a source and/or target radio cell; and the mobile terminal further determines whether or not the respective signal strength or signal quality of the source radio cell falls below one of the received threshold value(s) and/or the respective signal strength or signal quality of target radio cell rises above another of the received threshold value(s); wherein, upon the respective signal strength or signal quality having fallen below one of the at least one threshold value(s) and/or having risen above the other of the at least one threshold value(s), the mobile terminal is to trigger execution of the handoff to the target base station.

According to further more detailed embodiment of the method for performing the handoff, the threshold value for the signal strength corresponds to a threshold value for the reference signal received power, RSRP, to be measured by the mobile terminal based on reference signals, RSs, transmitted in the source and/or target radio cell; and/or or the threshold value for the signal quality corresponds to a threshold value for the reference signal received quality, RSRQ, to be measured by the mobile terminal based on reference signals, RSs, transmitted in the source and/or target radio cell.

According to yet another more detailed embodiment of the method for performing the handoff, the handoff execution condition, included in the received handoff command message, corresponds to an indication to trigger execution of the handoff based on out-of-sync events where a channel quality of a source radio cell falls below a pre-configured out-of-sync threshold (Qout); and the mobile terminal further determines whether or not the number of out-of-sync events exceeds the pre-configured number (N310) for the predefined period of time, wherein, in case the number of out-of-sync events exceeds the pre-configured number (N310) for the predefined period of time, the mobile terminal is to trigger execution of the handoff to the target base station.

According to an even further more detailed embodiment of the method for performing the handoff, the handoff execution condition, included in the received handoff command message, corresponds to a counter value for out-of-sync events where a channel quality of a source radio cell falls below a pre-configured out-of-sync threshold (Qout); and the determining mobile terminal further determines whether or not the number of out-of-sync events exceeds the received counter value (N310-alike) for the predefined period of time, wherein, in case the number of out-of-sync events exceeds the received counter value (N310-alike) for the predefined period of time, the mobile terminal is to trigger execution of the handoff to the target base station.

According to another more detailed embodiment of the method for performing the handoff, the handoff command message corresponds to a RRCConnectionReconfiguration message.

According to further more detailed embodiment, the method for performing the handoff, the handoff complete message corresponds to a RRCConnectionReconfiguration-Complete message.

According to yet another more detailed embodiment of the method for performing the handoff, in case the mobile terminal determines, within a second pre-configured period of time, that it is to trigger execution of the handoff to the target base station, the mobile terminal executes the handoff to the target base station including (a) performing a contention-free RACH procedure based on a random access preamble included in the handoff command message; and in case the mobile terminal determines, after expiry of the second pre-configured period of time, that it is to trigger execution of the handoff to the target base station, the mobile terminal executes the handoff to the target base station including (a) performing a contention-based RACH procedure based on a random access preamble randomly selected by the mobile terminal.

According to an even further more detailed embodiment of the method for performing the handoff, the received handoff command message includes a RACH validity timer, and the mobile terminal further re-configures the second pre-configured period of time based on the RACH validity timer.

According to another embodiment in line with the first aspect of the invention, a mobile terminal is suggested for performing a handoff of a mobile terminal to a target base station, wherein the mobile terminal is to be configured, under control of the target base station, for communication with the target base station via a target radio cell comprising a downlink carrier and an uplink carrier. A receiving circuit of the mobile terminal is configured to receive a handoff command message for the handoff to the target base station including a handoff execution condition as trigger for executing handoff to the target base station. A processor of the mobile terminal is configured to determine, based on the received handoff execution condition included in the handoff command message, whether or not the mobile terminal is to trigger execution of the handoff to the target base station. In case the processor of the mobile terminal determines that the mobile terminal is to trigger execution of the handoff to the target base station, the mobile terminal executes the handoff to the target base station (a) by performing a random access channel, RACH, procedure with the target base station to thereby time align the uplink carrier of the target radio cell, and (b) by transmitting to the target base station a handoff complete message thereby indicating completion of the handoff to the target base station including completion of configuration of the mobile terminal for communication with the target base station via the target radio cell.

According to a more detailed embodiment, the mobile terminal, prior to receiving the handoff command message, is configured for communication with a source base station via a source radio cell; and the receiving circuit is configured to receive the handoff command message from the source base station via a downlink carrier of the source radio cell; and, after receiving the handoff command message, the mobile terminal is configured to detach from the source radio cell whereby communication with the source base station is stopped.

According to another more detailed embodiment of the mobile terminal, in case the processor of the mobile terminal does not, within a first pre-configured period of time, determine that the mobile terminal is to trigger execution of the handoff to the target base station, the mobile terminal is configured to discard the received handoff command message.

According to further more detailed embodiment of the mobile terminal, the received handoff command message includes a handoff validity timer, and the processor of the mobile terminal is configured to re-configure the first pre-configured period of time based on the handoff validity timer.

According to yet another more detailed embodiment of the mobile terminal, the handoff execution condition, included in the received handoff command message, corresponds to a timer value; and the processor of the mobile terminal is configured to determine whether or not a timer with the timer value has expired; wherein, upon expiration of the timer with the timer value, the mobile terminal is to trigger execution of the handoff to the target base station.

According to an even further more detailed embodiment of the mobile terminal, the handoff execution condition, included in the received handoff command message, corresponds to an indication to trigger execution of the handoff based on pre-configured threshold values for the signal strength or signal quality of a source and/or target radio cell; and the processor of the mobile terminal is configured to determine whether or not the respective signal strength or signal quality of the source radio cell falls below one of the pre-configured threshold values and/or the respective signal strength or signal quality of target radio cell rises above another of the pre-configured threshold values; wherein, upon the respective signal strength or signal quality having fallen below the one of the pre-configured threshold values and/or having risen above the other of the pre-configured threshold values, the mobile terminal is to trigger execution of the handoff to the target base station.

According to another more detailed embodiment of the mobile terminal, the handoff execution condition, included in the received handoff command message, corresponds to at least one threshold value for the signal strength or signal quality of a source and/or target radio cell; and the processor of the mobile terminal is configured to determine whether or not the respective signal strength or signal quality of the source radio cell falls below one of the received threshold value(s) and/or the respective signal strength or signal quality of target radio cell rises above another of the received threshold value(s); wherein, upon the respective signal strength or signal quality having fallen below one of the at least one threshold value(s) and/or having risen above the other of the at least one threshold value(s), the mobile terminal is to trigger execution of the handoff to the target base station.

According to further more detailed embodiment of the mobile terminal, the threshold value for the signal strength corresponds to a threshold value for the reference signal received power, RSRP, to be measured by the mobile terminal based on reference signals, RSs, transmitted in the source and/or target radio cell; and/or the threshold value for the signal quality corresponds to a threshold value for the reference signal received quality, RSRQ, to be measured by the mobile terminal based on reference signals, RSs, transmitted in the source and/or target radio cell.

According to yet another more detailed embodiment of the mobile terminal, the handoff execution condition, included in the received handoff command message, corresponds to an indication to trigger execution of the handoff based on out-of-sync events where a channel quality of a source radio cell falls below a pre-configured out-of-sync threshold (Qout); and the processor of the mobile terminal is configured to determine whether or not the number of out-of-sync events exceeds the pre-configured number (N310) for the predefined period of time, wherein, in case the number of out-of-sync events exceeds the pre-configured number (N310) for the predefined period of time, the mobile terminal is to trigger execution of the handoff to the target base station.

According to an even further more detailed embodiment of the mobile terminal, the handoff execution condition, included in the received handoff command message, corresponds to a counter value for out-of-sync events where a channel quality of a source radio cell falls below a pre-configured out-of-sync threshold (Qout); and the processor of the mobile terminal is configured to determine whether or not the number of out-of-sync events exceeds the received counter value (N310-alike) for the predefined period of time, wherein, in case the number of out-of-sync events exceeds the received counter value (N310-alike) for the predefined period of time, the mobile terminal is to trigger execution of the handoff to the target base station.

According to another more detailed embodiment of the mobile terminal, the handoff command message corresponds to a RRCConnectionReconfiguration message.

According to further more detailed embodiment of the mobile terminal, the handoff complete message corresponds to a RRCConnectionReconfigurationComplete message.

According to yet another more detailed embodiment of the mobile terminal, in case the processor determines, within a second pre-configured period of time, that the mobile terminal is to trigger execution of the handoff to the target base station, the mobile terminal executes the handoff to the target base station including performing a contention-free RACH procedure based on a random access preamble included in the handoff command message; and in case the processor determines, after expiry of the second pre-configured period of time, that the mobile terminal is to trigger execution of the handoff to the target base station, the mobile terminal executes the handoff to the target base station including performing a contention-based RACH procedure based on a random access preamble randomly selected by the mobile terminal.

According to an even further more detailed embodiment of the mobile terminal, the received handoff command message includes a RACH validity timer, and the processor of the mobile terminal is configured to re-configure the second pre-configured period of time based on the RACH validity timer.

According to a further embodiment in line with the first aspect of the invention, a computer readable medium is suggested which is storing instructions that, when executed by a processor of a mobile terminal, cause the mobile terminal to perform a handoff to a target base station, wherein the mobile terminal is to be configured, under control of the target base station, for communication with the target base station via a target radio cell comprising a downlink carrier and an uplink carrier, by: receiving a handoff command message for the handoff to the target base station including a handoff execution condition as trigger for executing handoff to the target base station; and determining, based on the received handoff execution condition included in the handoff command message, whether or not the mobile terminal is to trigger execution of the handoff to the target base station; wherein, in case the mobile terminal determines that it is to trigger execution of the handoff to the target base station, the mobile terminal executes the handoff to the target base station (a) by performing a random access channel, RACH, procedure with the target base station to thereby time align the uplink carrier of the target radio cell, and (b) by transmitting to the target base station a handoff complete message thereby indicating completion of the handoff to the target base station including completion of configuration of the mobile terminal for communication with the target base station via the target radio cell.

According to a different embodiment of the invention, a method is proposed for configuring measurement cycles of a mobile terminal being connected via a macro radio cell to a master base station and via a small radio cell to a secondary base station, the macro and the small radio cell being configured for a same frequency. The master base station determines a geographical distance between the master base station and the secondary base station. Then, the master base station compares the determined geographical distance to a pre-configured distance threshold. Thereafter, the master base station generates a measurement control message for the mobile terminal including a first measurement object with a measurement cycle for the macro radio cell and a second measurement object with a measurement cycle for the small radio cell; and the master base station transmits the measurement control message to the mobile terminal for configuring measurement cycles of the mobile terminal; wherein the measurement cycle within the transmitted first measurement object for the macro radio cell is set based on a result of the comparison of the determined geographical distance to the pre-configured distance threshold.

According to a more detailed embodiment of the method for configuring measurement cycles, in case the result of the comparison indicates that the determined geographical distance is smaller than the pre-configured distance threshold, the master base station further sets the measurement cycle within the transmitted first measurement object for the macro radio cell to a value which indicates measurement relaxation to the mobile terminal.

According to another more detailed embodiment of the method for configuring measurement cycles, in case the result of the comparison indicates that the determined geographical distance is smaller than the pre-configured distance threshold, the master base station further setts the measurement cycle within the transmitted first measurement object for the macro radio cell to a value which corresponds to more than 5 measurement cycles of the small radio cell.

According to further more detailed embodiment of the method for configuring measurement cycles, in case the result of the comparison indicates that the determined geographical distance is smaller than the pre-configured distance threshold, the master base station further sets the measurement cycle within the transmitted first measurement object for the macro radio cell to a value which indicating deactivation of the measurements.

According to yet another more detailed embodiment of the method for configuring measurement cycles, the master base station looks up the geographical position of the secondary base station from a location information table stored in the master base station.

According to an even further more detailed embodiment of the method for configuring measurement cycles, the master base station receives from the secondary base station location information indicating the geographical position thereof.

According to another more detailed embodiment of the method for configuring measurement cycles, the master base station measures a signal strength of reference signals that are transmitted by the secondary base station via the small radio cell.

According to further more detailed embodiment of the method for configuring measurement cycles, the master base station receives at least one measurement report from the mobile terminal indicating a signal strength of reference signals that are transmitted by the secondary base station via the small radio cell and indicating a signal strength of reference signals that are transmitted by the master base station via the macro radio cell.

According to yet another more detailed embodiment of the method for configuring measurement cycles, the master base station measures a round-trip-time of information transmitted to and received from the secondary base station.

According to another different embodiment of the invention, a master base station is proposed for configuring measurement cycles of a mobile terminal being connected via a macro radio cell to the master base station and via a small radio cell to a secondary base station, the macro and the small radio cell being configured for a same frequency. A processor of the master base station is configured to determine a geographical distance between the master base station and the secondary base station; and the processor of the master base station is further configured to compare by the master base station the determined geographical distance to a pre-configured distance threshold.

A transmitting circuit of the master base station is configured to generate a measurement control message for the mobile terminal including a first measurement object with a measurement cycle for the macro radio cell and a second measurement object with a measurement cycle for the small radio cell; and the transmitting circuit of the master base station is further configured to transmit the measurement control message to the mobile terminal for configuring measurement cycles of the mobile terminal. The measurement cycle within the transmitted first measurement object for the macro radio cell is set by the master base station based on a result of the comparison of the determined geographical distance to the pre-configured distance threshold.

According to a more detailed embodiment of the master base station, in case the result of the comparison indicates that the determined geographical distance is smaller than the pre-configured distance threshold, the transmitting circuit of the master base station is configured to set the measurement cycle within the transmitted first measurement object for the macro radio cell to a value which indicates measurement relaxation to the mobile terminal.

According to another more detailed embodiment of the master base station, in case the result of the comparison indicates that the determined geographical distance is smaller than the pre-configured distance threshold, the transmitting circuit of the master base station is configured to set the measurement cycle within the transmitted first measurement object for the macro radio cell to a value which corresponds to more than 5 measurement cycles of the small radio cell.

According to further more detailed embodiment of the master base station, in case the result of the comparison indicates that the determined geographical distance is smaller than the pre-configured distance threshold, the transmitting circuit of the master base station is configured to set the measurement cycle within the transmitted first measurement object for the macro radio cell to a value which indicating deactivation of the measurements.

According to yet another more detailed embodiment, the processor of the master base station is configured to look up the geographical position of the secondary base station from a location information table stored in the master base station.

According to an even further more detailed embodiment, the processor of the master base station is configured to receive from the secondary base station location information indicating the geographical position thereof.

According to another more detailed embodiment, the processor of the master base station is configured to measure a signal strength of reference signals that are transmitted by the secondary base station via the small radio cell.

According to further more detailed embodiment, a receiving circuit of the master base station is configured to receive at least one measurement report from the mobile terminal indicating a signal strength of reference signals that are transmitted by the secondary base station via the small radio cell and indicating a signal strength of reference signals that are transmitted by the master base station via the macro radio cell.

According to yet another more detailed embodiment, a receiving circuit of the master base station is configured to measure station a round-trip-time of information transmitted to and received from the secondary base station.

According to a further different embodiment of the invention, a computer readable medium is proposed which is storing instructions that, when executed by a processor of a master base station, cause the master base station to configuring measurement cycles of a mobile terminal being connected via a macro radio cell to a master base station and via a small radio cell to a secondary base station, the macro and the small radio cell being configured for a same frequency, by: determining a geographical distance between the master base station and the secondary base station; comparing the determined geographical distance to a pre-configured distance threshold; generating a measurement control message for the mobile terminal including a first measurement object with a measurement cycle for the macro radio cell and a second measurement object with a measurement cycle for the small radio cell; and transmitting the measurement control message to the mobile terminal for configuring measurement cycles of the mobile terminal; wherein the measurement cycle within the transmitted first measurement object for the macro radio cell is set based on a result of the comparison of the determined geographical distance to the pre-configured distance threshold.

BRIEF DESCRIPTION OF THE FIGURES

In the following the invention is described in more detail with reference to the attached figures and drawings.

DETAILED DESCRIPTION OF THE INVENTION

Figure 1:
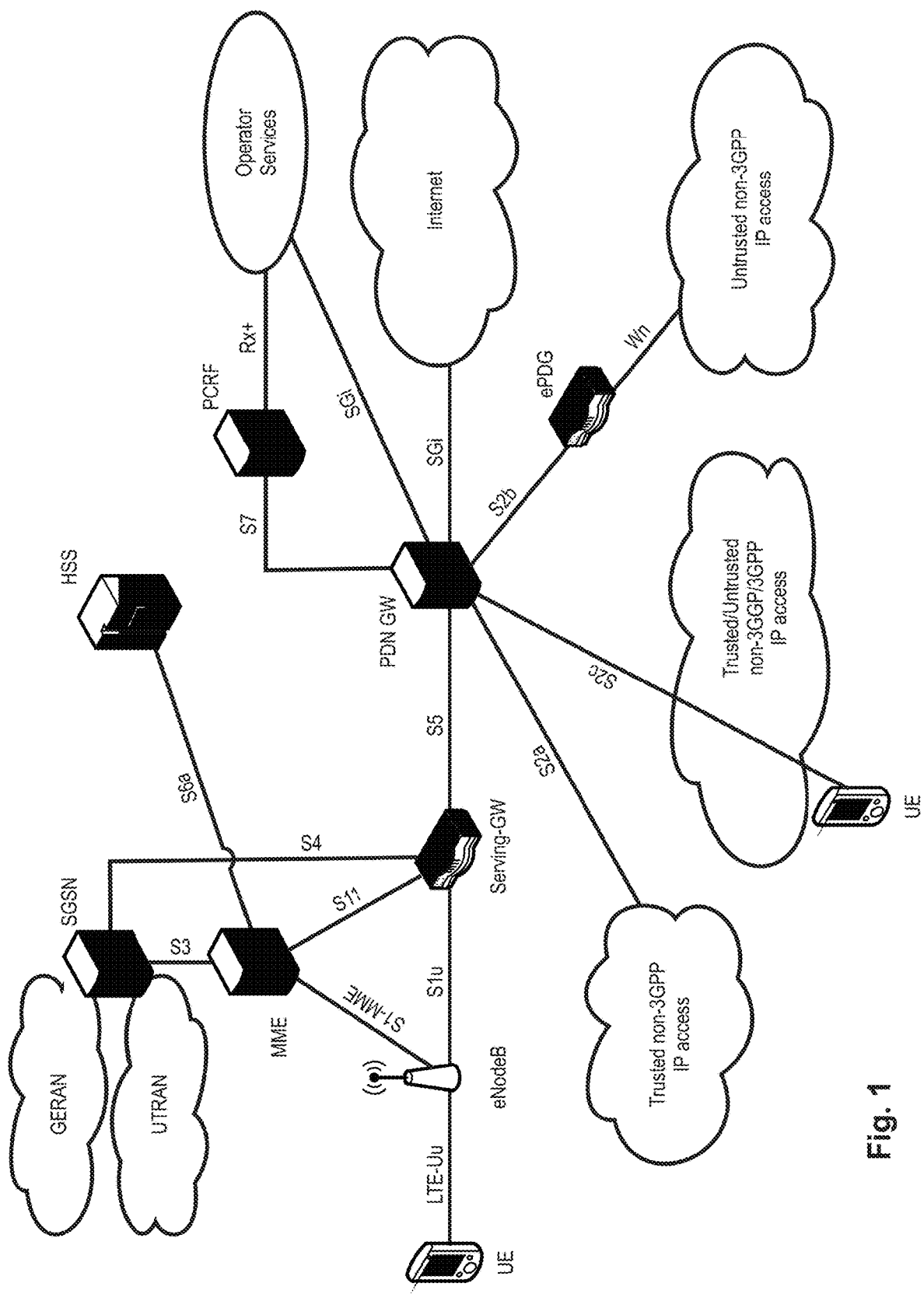
FIG. 1 shows an exemplary architecture of a 3GPP LTE system.
Figure 2:
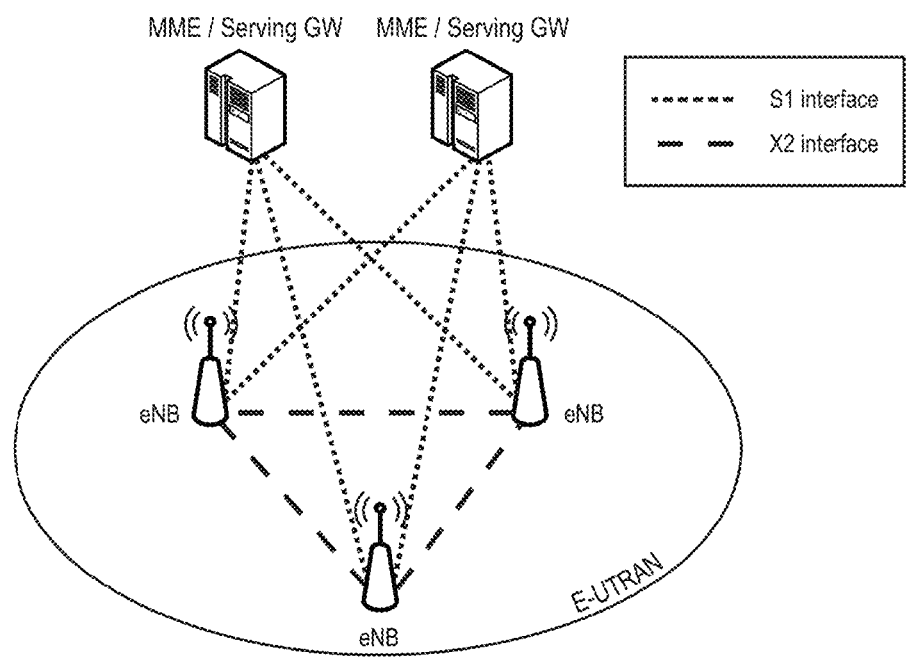
FIG. 2 shows an exemplary overview of the overall E-UTRAN architecture of 3GPP LTE.
Figure 3:
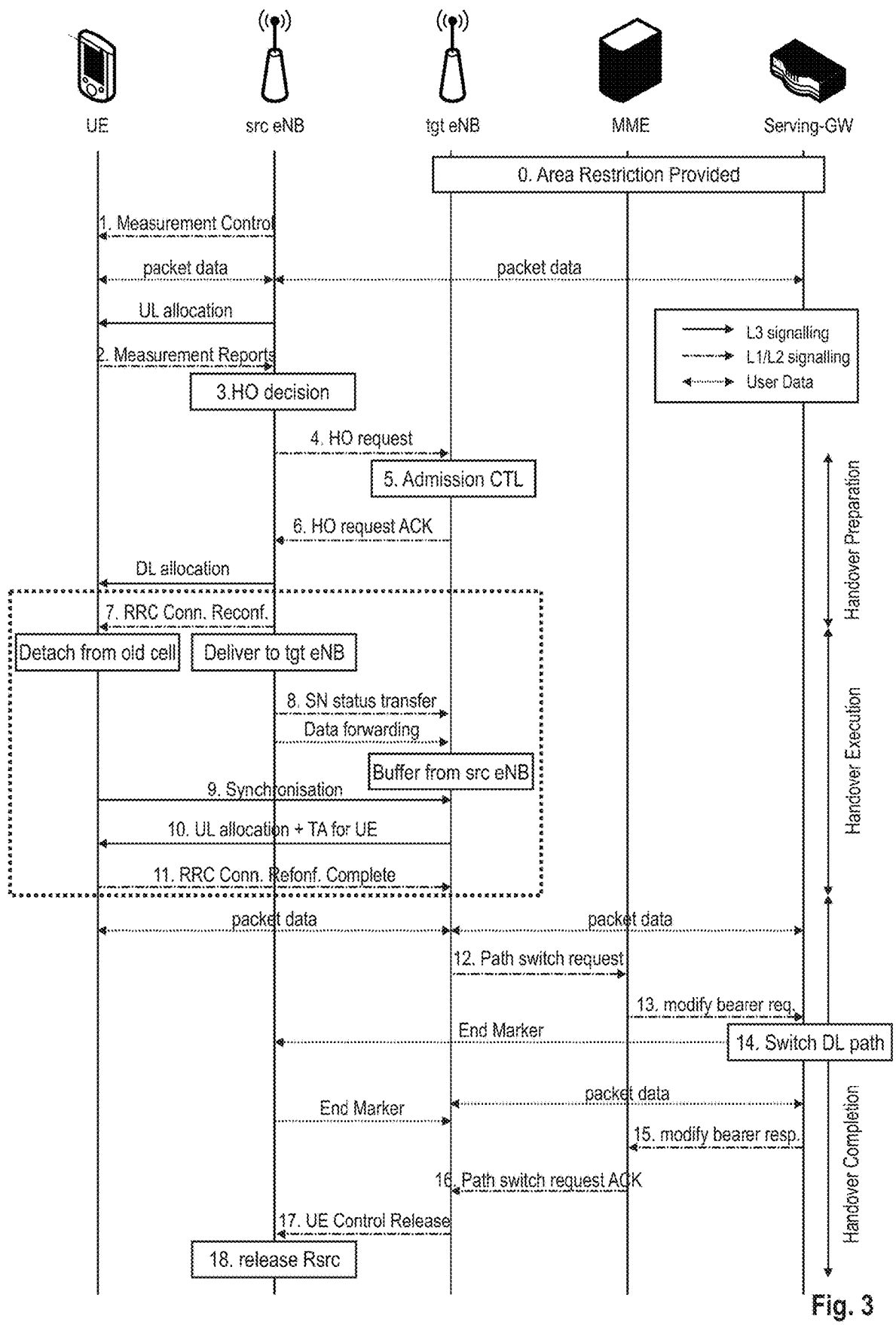
FIG. 3 shows a sequence diagram of an Intra-MME/Serving Gateway Handover procedure as defined in 3GPP LTE Release 8/9.
Figure 4:
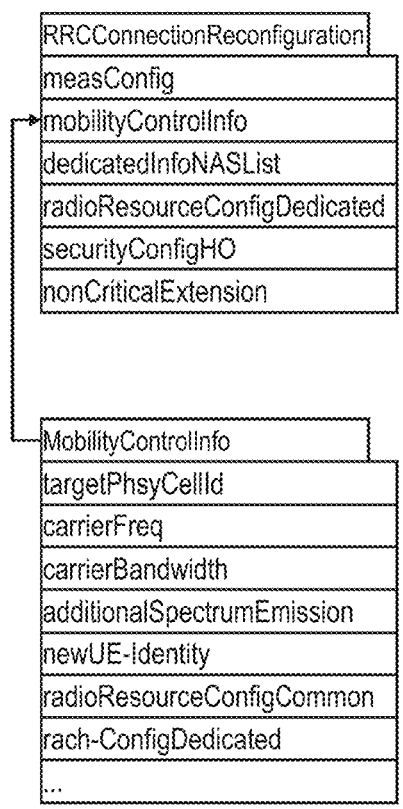
FIG. 4 illustrates an RRCConnectionReconfiguration message as defined in 3GPP LTE Release 8/9 to be used as Handover command message in Handover procedures.
Figure 5:
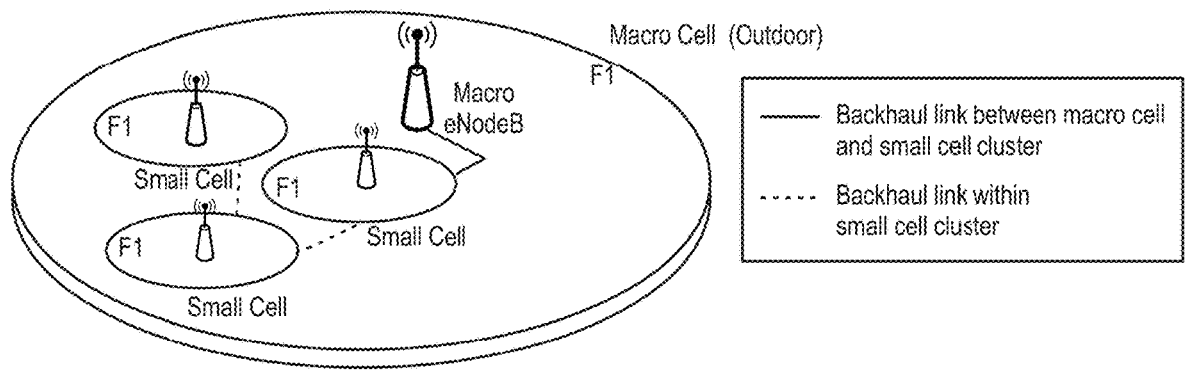
FIG. 5 illustrates a deployment scenario for small cell enhancement, where macro and small cells are on the same carrier frequency.
Figure 6:
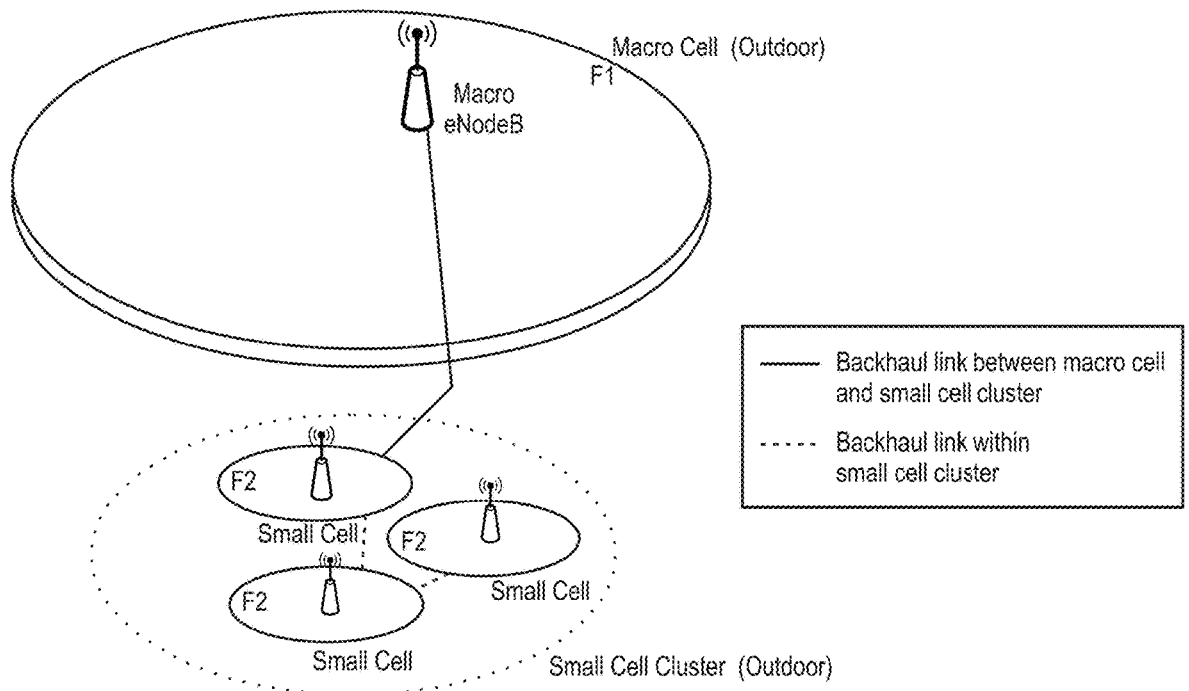
FIGS. 6 and 7 illustrate further deployment scenarios for small cell enhancement where macro and small cells are on different carrier frequencies, the small cell being respectively outdoor and indoor.
Figure 7:
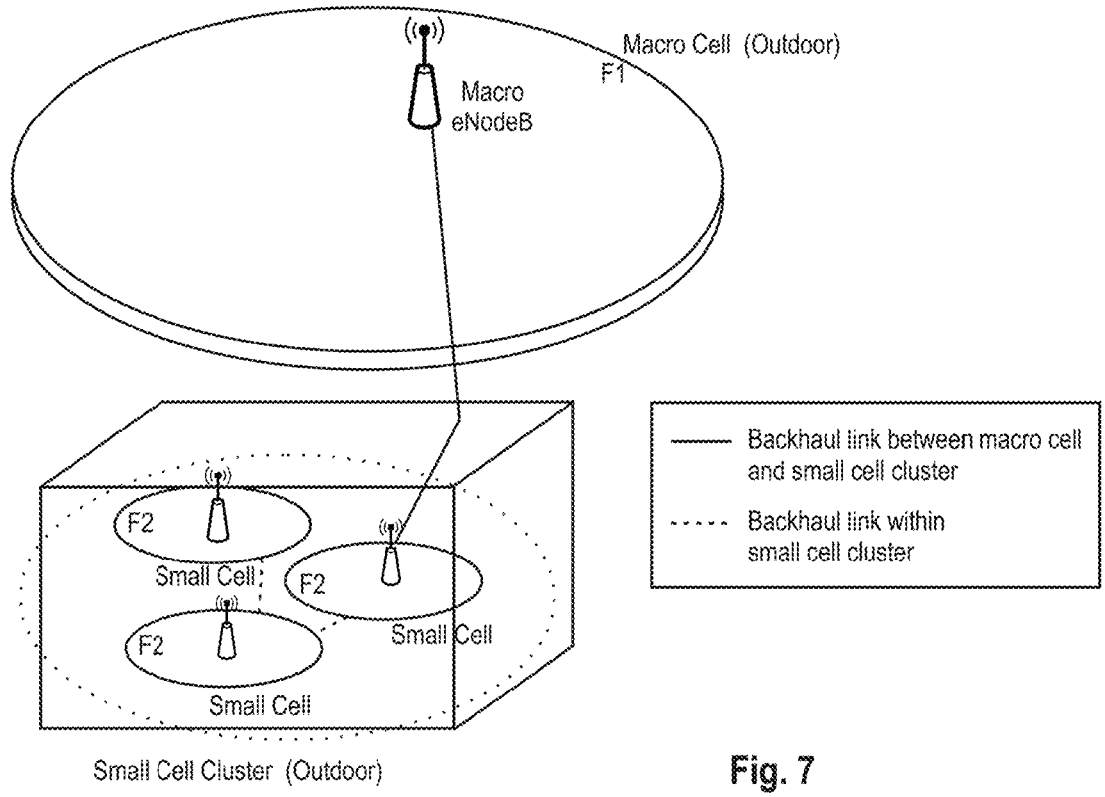
Figure 8:
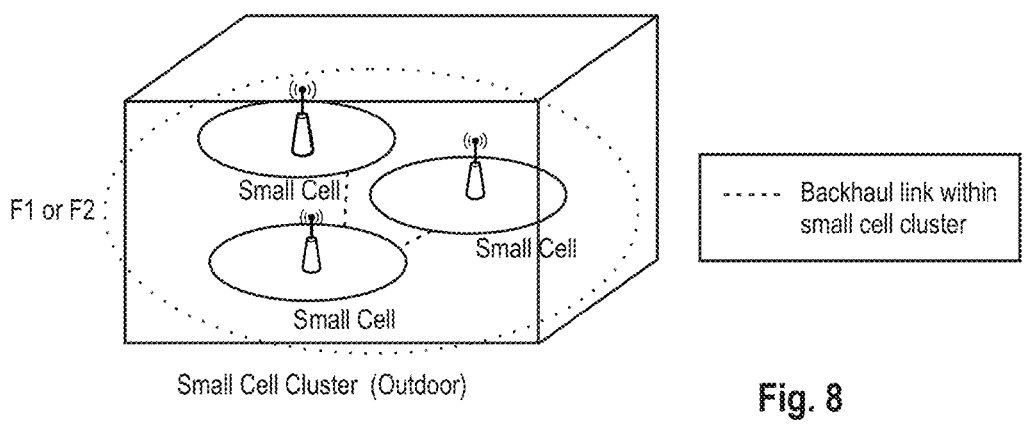
FIG. 8 illustrates a further deployment scenario for small cell enhancement with only small cells.
Figure 9:
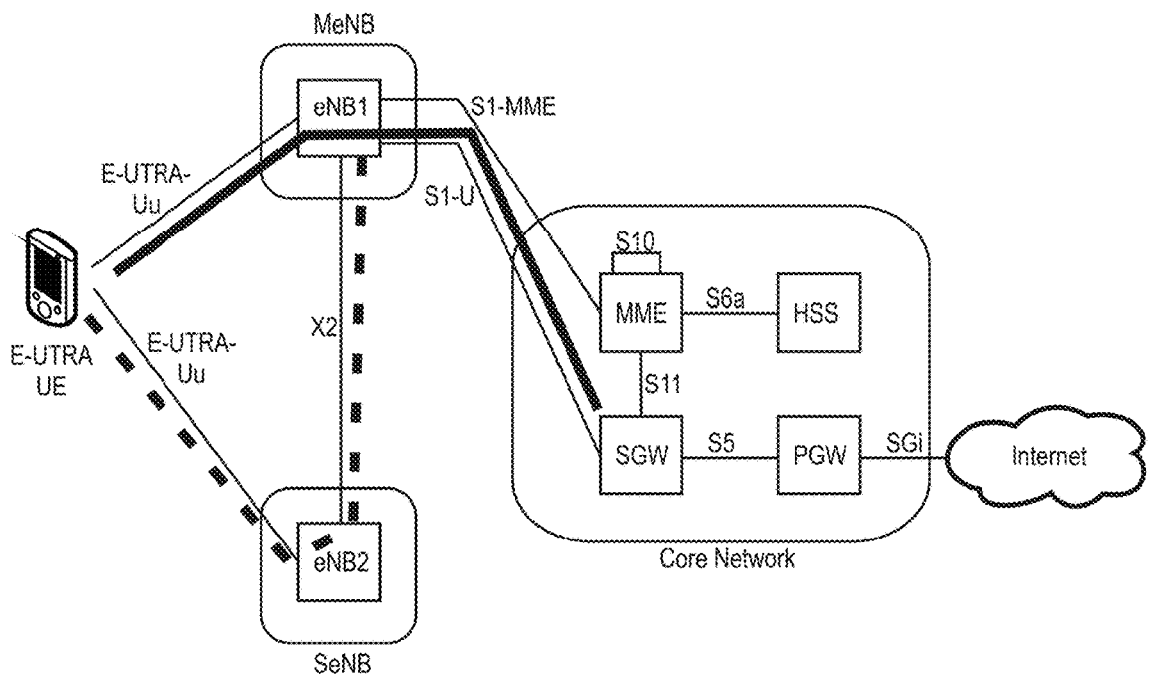
FIG. 9 gives an overview of the communication system architecture for dual connectivity with macro and small eNBs connected to the core network, where the S1-U interface terminates in the Macro eNB and no bearer splitting is done in RAN.
Figures 10A, 10B, 10C:
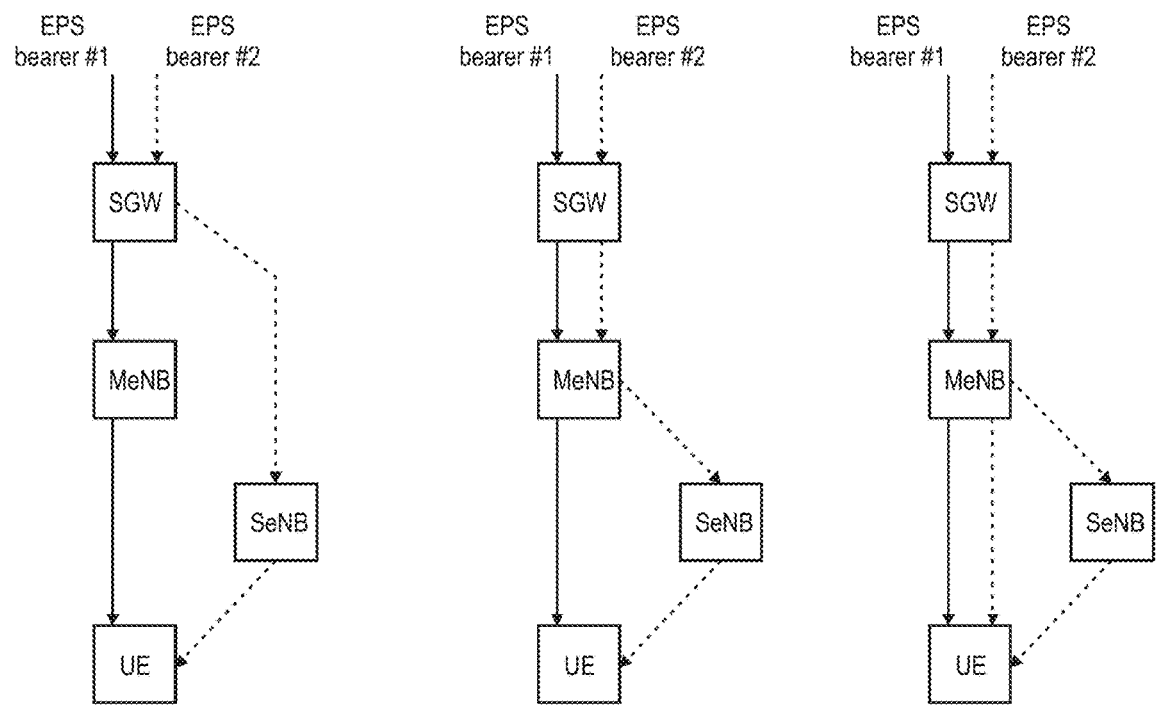
FIGS. 10a-c illustrate the different options for having two separate EPS bearers between the SGW and the UE.

The following paragraphs will describe various embodiments of the invention. For exemplary purposes only, most of the embodiments are outlined in relation to a radio access scheme according to 3GPP LTE (Release 8/9) and LTE-A (Release 10/11) mobile communication systems, partly discussed in the Technical Background section above. It should be noted that the invention may be advantageously used, for example, in a mobile communication system such as 3GPP LTE-A (Release 10/11/12) communication systems as described in the Technical Background section above, but the invention is not limited to its use in this particular exemplary communication networks.

In the context of the invention, a "mobile terminal" or "mobile node" is to be understood as a physical entity within a wireless communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

Further, the term "master base station" used throughout the description of the invention is to be construed in the sense of the terms macro base station, or master/macro eNB conventionally found in the field of dual connectivity of 3GPP LTE-A. Similarly, the term "secondary base station" is to be understood in the same sense as the terms slave base station, or secondary/slave eNB also used in connection with dual connectivity.

With respect to the terms "handoff" or "handoff procedure" it shall be emphasized that the invention intends to avoid any implications that are inherent to the terms "handover" or "handover procedure" in wireless communication. Moreover, the term "handoff" is to be understood as referring to any attempt by a mobile terminal to set up communication with a target base station via a target radio cell comprising a downlink carrier and an uplink carrier.

Nevertheless, it shall be pointed out that the terms "handoff" or "handoff procedure" will be referred to as "handover" or as "handover procedure" in order to allow for a consistent explanation in connection with the terminology employed by 3GPP LTE. In other words, although the term "handoff" is to be construed in a broad sense, the detailed description outlines the invention as various implementations referring to the term "handover" generally used in 3GPP LTE. In that sense, the "handoff command message" and the "handoff complete message" are linked to the "handover command message" and "handover complete message" defined in the background art.

The term "condition" or more precisely "handoff execution condition" has been used throughout the description as a name for an additional data field of the handoff command message. The handoff execution condition refers to a condition to be evaluated by the mobile terminal. In this respect, the handoff execution condition may indicate that the mobile terminal is to evaluate the indicated condition based on a pre-configured value. Alternatively, the handoff execution condition may be an actual value based on which the indicated condition is to be evaluated by the mobile terminal.

Additionally, in the description the term "geographical distance" has been employed to denote a coverage relationship between a master base station and a secondary base station. In other words, in case the secondary and the master base station provide for a same or a similar coverage area, both base stations are referred to as being located at a small geographical distance from each other. Similarly, in case the master and the secondary base station provide for substantially different coverage areas, both base stations are referred to as being located at a large geographical distance from each other.

Nevertheless, it shall be pointed out that the term "geographical distance" is not the only term to reflect this coverage relationship between the master and the secondary base station, but equally the term "path loss" can be used. For example, in case of a small "path loss" between the master and the secondary base station, the two base stations provide for a same or similar coverage area, and hence, are referred to as being located at a small geographical distance from each other. Similarly, in case of a high "path loss" between the master and the secondary base station, the two base stations provide for substantially different coverage areas, and hence, are referred to as being located at a large geographical distance from each other. Consequently, the two terms "geographical distance" and "path loss" shall be understood as equivalents in the context of the invention.

In the following, several embodiments of the invention will be explained in detail. These embodiments are described as implementations for use in connection with and/or for enhancement of functionality specified in 3GPP LTE and/or LTE-A. In this respect, the terminology of 3GPP LTE and/or LTE-A is employed throughout the description. Further, exemplary configurations are explored to detail the full breadth of the invention.

The explanations should not be understood as limiting the invention, but as a mere example of the invention's embodiments to better understand the invention. A skilled person should be aware that the general principles of the invention as laid out in the claims can be applied to different scenarios and in ways that are not explicitly described herein. Correspondingly, the following scenarios assumed for explanatory purposes of the various embodiments shall not limit the invention as such.

First Embodiment

Figure 11:
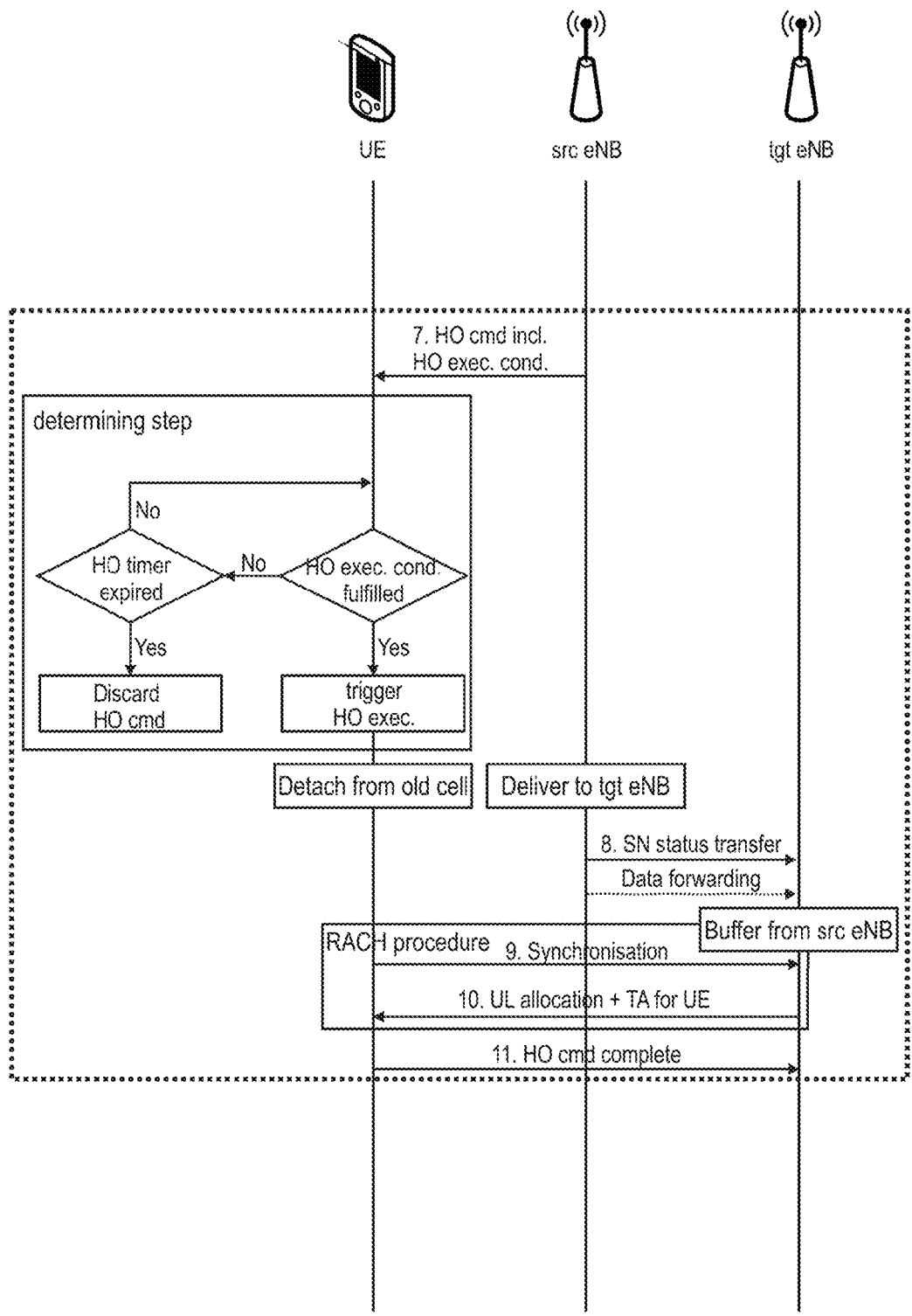
FIG. 11 exemplifies an improved handover procedure according to the first embodiment of the invention.

Referring now to the first embodiment of the invention, various implementations of an improved handover procedure are to be discussed in connection with FIGS. 11 to 14. Specifically, FIG. 11 illustrates a sequence diagram of the handover procedure to a target base station to be performed by a mobile terminal.

In the context of the first embodiment, it is assumed that the mobile terminal is initially configured for communication with a source base station via a source radio cell. The mobile terminal is in the RRC CONNECTED state with respect to the source radio cell. The mobile terminal then performs the handover procedure for it to be configured for communication with the target base station via a target radio cell. As a result of successful completion of the handover procedure, the mobile terminal detaches from the source radio cell, and remains in the RRC CONNECTED state with respect to the target radio cell.

The handover procedure is performed under control of the target base station. In particular, the target base station generates a message for the mobile terminal to perform the handover (i.e. handover command message). Subsequently, the handover command message for the mobile terminal to perform handover is forwarded to the mobile terminal by the source base station. Upon receipt of the handover command message (cf. message 7 in FIG. 11), the mobile terminal performs the handover procedure. After successful completion of the handover, the mobile terminal indicates same by transmitting a handover complete message to the target base station (cf. message 11 in FIG. 11).

According to an exemplary implementation, the handover command message is an RRC message, namely the RRC-ConnectionReconfiguration message. The handover command message originates from the target base station with information required for the mobile terminal to establish a connection thereto, namely the mobilityControlInformation. According to another exemplary implementation, the handover complete message is also an RRC message, namely the RRCConnectionReconfigurationComplete message.

Figure 12:
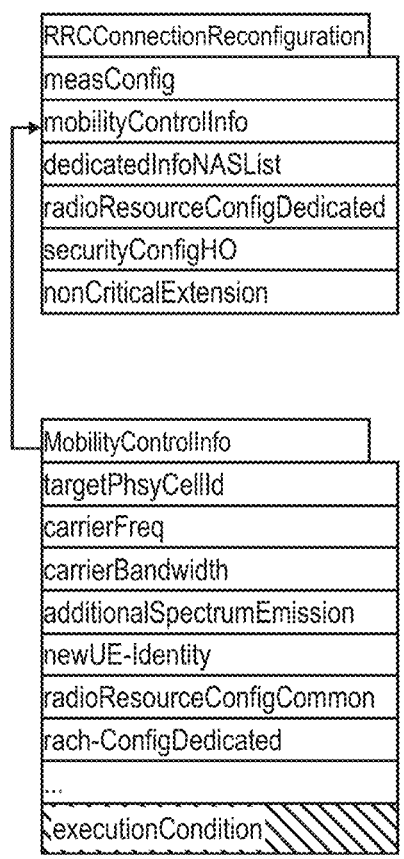
FIG. 12 illustrates a handover command message including a handover execution condition according to the first embodiment of the invention.

According to the first embodiment, the handover command message is enhanced to additionally include information termed handover execution condition. The handover execution condition refers to information based on which the mobile terminal determines whether or not a handover is to be performed to the target base station. Accordingly, handover execution condition included in the handover command message can be understood as a trigger for the execution of the handover. According to the exemplary implementation, the RRCConnectionReconfiguration message including the (handover) execution condition is illustrated in FIG. 12.

In this respect, an additional step of evaluating the handover execution condition is performed by the mobile terminal before the handover to the target message is carried out. In case the mobile terminal determines that the handover execution condition is fulfilled, the mobile terminal proceeds with triggering execution of the handover to the target base station. Similarly, in case the mobile terminal determines that the handover execution condition is not fulfilled, the mobile terminal proceeds with discarding the received handover command message.

The handover execution condition may have different implementations as will become apparent from the respective description below. Irrespective thereof, it is inherent to all implementations of the handover execution condition that the mobile terminal is provided with information indicating what determination is to be carried out by the mobile terminal and when (i.e. under which condition) it is to trigger execution of the handover to the target base station.

Accordingly, in view of this definition of the handover execution condition included in the handover command message it may be appreciated that the target base station remains in control of the handover procedure. Moreover, the determination of the mobile terminal based on the handover execution condition merely assists in the target base station finding an advantageous point in time for the execution of the handover.

Specifically, in carrying out the determination based on the handover execution condition, the mobile terminal may delay or may even prevent execution of the handover to the target base station. In this respect, the handover command message including the handover execution condition cannot be understood as resulting in a one-way-street situation wherein the mobile terminal immediately executes the handover to the target base station.

Advantageously, due to the mobile terminal additionally determining whether or not the indicated handover execution condition is met, the point in time when the mobile terminal receives the handover command message is separate from (e.g. spaced apart from) the point in time when the mobile terminal may execute the handover to the target base station.

This separation is beneficial in view of an optimal timing of the handover: The mobile terminal may delay/defer execution of the handover to the target base station up to a point in time where its connectivity has reduced (e.g. up to the border of the source radio cell). In this respect, a handover to the target base station may be delayed/deferred up to a point in time where reception of the handover command message would no longer be possible. Accordingly, the invention strives to prevent from too early handovers by solving the problem of too late handovers (i.e. lost handover command messages due to poor radio conditions in the source radio cell).

Further, the additional determination of whether or not the handover execution condition is met leaves the mobile terminal with an additional degree of freedom for it to determine an ideal timing of the execution of the handover to the mobile terminal.

However, this additional degree of freedom may be well balanced in the sense that the handover command message includes an indication of a specific handover execution condition which is to trigger execution of the handover to the target base station. In other words, by specifying the handover execution condition included in the handover command message, the mobile terminal under control of the target base executes handover in a manner that is predictable time-wise to the target base station.

According to an exemplary implementation, the mobile terminal is configured to only trigger execution of the handover to the target base station within a first pre-configured period of time. In other words, in case the mobile terminal does not, within the first pre-configured period of time, determine that it is to trigger execution of the handover to the target base station, the mobile terminal discards the received handover command message. This exemplary implementation further improves predictability to the target base station in the sense that the target base station knows the time period during which a handover can occur.

According to a modification of the above noted exemplary implementation, the handover command message includes a handover validity timer based on which the first pre-configured period of time may be set. Moreover, upon reception of a handover command message including the handover validity timer by the mobile terminal, it is adapted to re-configure the first pre-configured period of time based on the received handover validity timer.

Further, in case the mobile terminal determines that it is to trigger execution of the handover to the target base station, the mobile terminal executes the handover to the target base station.

The execution of the handover to the target base station includes (a) performing a random access channel, RACH, procedure (cf. messages 9 and 10 in FIG. 11) with the target base station to thereby time align the uplink carrier of the target radio cell. The timing of the uplink carrier is aligned by the mobile terminal based on a timing advance, TA, value received from the target access point. Further, the execution of the handover includes (b) transmitting to the target base station a handover complete message (cf. message 11 in FIG. 11). Thereby the completion of the handover to the target base station is indicated by the mobile terminal. Consequently, the configuration of the mobile terminal for communication with the target base station via the target radio cell is completed.

In summary, the first embodiment provides for the following advantages:

- The mobile terminal's reception of handover command message from the source radio cell can be guaranteed since transmission of this message under bad radio link condition is no longer necessary.
- The offloading gain (i.e. Time of Stay of the mobile terminal in the source radio cell) increases.
- Radio link failures, RLF (and subsequently radio link re-establishment) is avoided and therefore RRC Connection re-establishment time corresponding to a substantial interruption of radio connectivity is avoided.
- New mobile terminal's behavior (for monitoring target cell before handover) requiring dual connectivity is avoided (therefore, issues like target C-RNTI allocation/PDCCH monitoring is avoided).
- No resource restriction/almost blank subframe, ABS. coordination/handover protection from target radio cell is required.
- Dedicated random access preamble reservation for the mobile terminal upon handover to the target radio cell is not needed; instead, any combination of dedicated random access preamble reservation (for a pre-configured period of time) and thereafter contention based RACH is suggested for handover by the mobile terminal to the target radio cell.

First Implementation

Figure 13C:
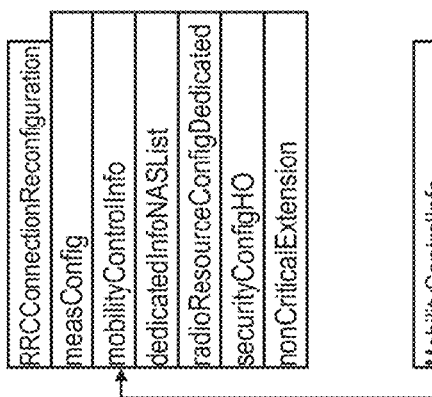
FIGS. 13*a-c* show different implementations of handover command messages according to the first embodiment of the invention.
Figure 13C:
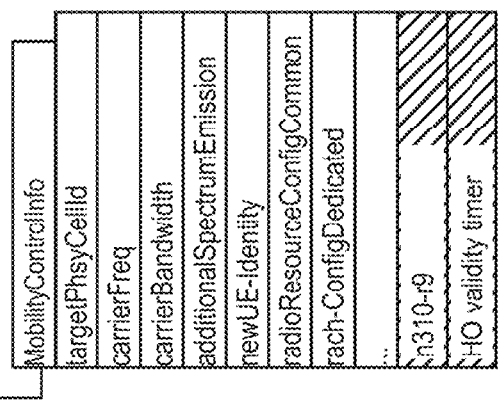
Figure 13B:
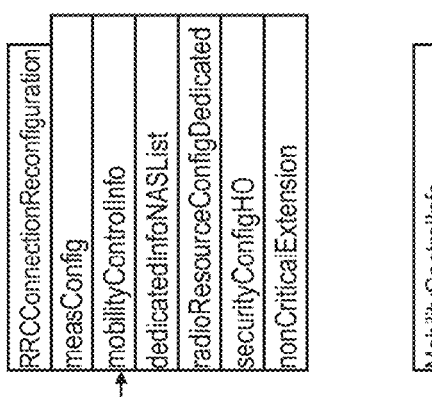
Figure 13B:
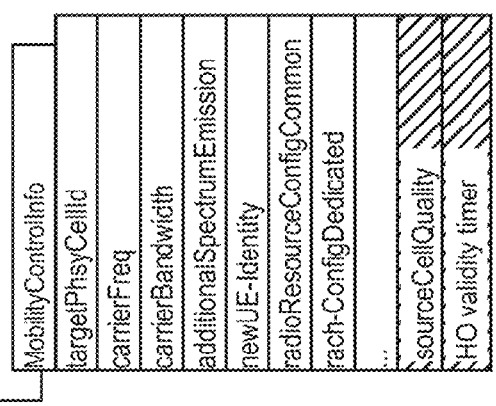
Figure 13A:
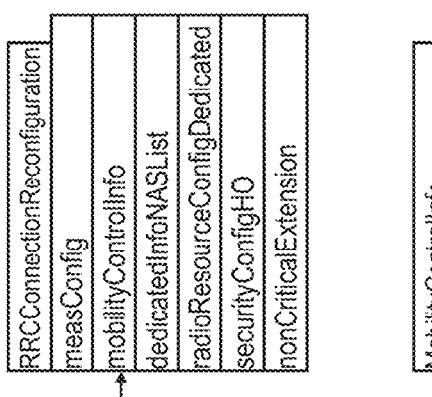
Figure 13A:
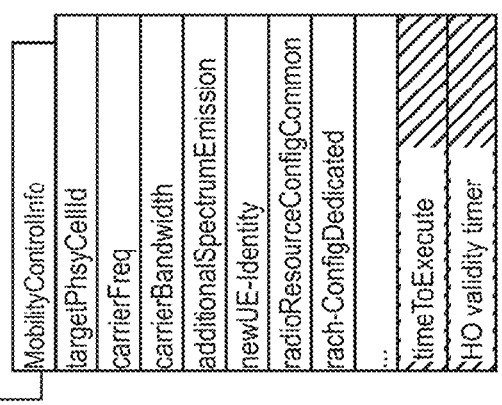
Figure 14:
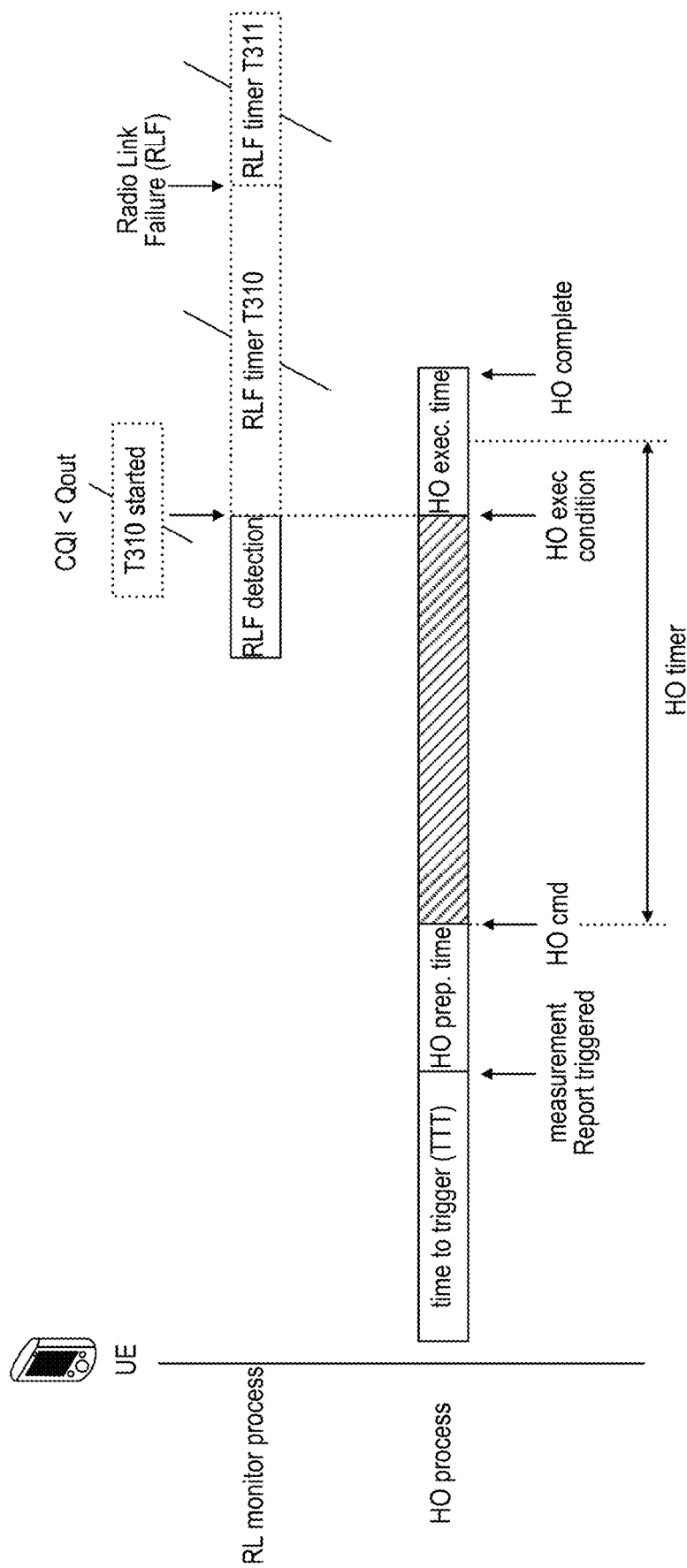
FIG. 14 illustrates a third implementation of the handover procedure according to the first embodiment in more detail.

According to a first implementation of the first embodiment, the handover execution condition corresponds to a timer value. The timer value is included in the handover command message as handover execution condition and received as same by the mobile terminal. Since the target base station generates the handover command message, the timer value is known not only to the mobile terminal but also to the target base station. An exemplary realization of the handover command message according to the first implementation is shown in FIG. 13*a*.

In response to the receipt of the timer value included in the handover command message as handover execution condition, the mobile terminal determines whether or not a timer of the received timer value has expired. Upon expiration of the timer, the mobile terminal is to trigger execution of the handover to the target base station.

As an implementation constraint, the timer value of this first implementation has to be smaller than the first pre-configured period of time after which the handover command message is discarded. Similarly, the timer value of this first implementation has also to be smaller than a potentially received handover validity timer also determining the first pre-configured period of time after which the handover command message is discarded. Otherwise, the mobile terminal would never determine that it is to trigger execution of the handover to the target base station.

Second Implementation

According to a second implementation of the first embodiment, the handover execution condition corresponds to at least one threshold value for either a signal strength or a signal quality of the source and/or target radio cell. This second implementation makes use of physical layer measurements performed by the mobile terminal. The threshold value(s) of the signal strength or signal quality of the source and/or target radio cell is (are) included in the handover command message as handover execution condition and are received as same by the mobile terminal. Since the target base station generates the handover command message, the threshold value(s) is (are) known not only to the mobile terminal but also to the target base station. An exemplary realization of the handover command message according to the second implementation is shown in FIG. 13*b*.

Depending on which threshold value(s) are included and hence received in the handover command message as handover execution condition, three different behaviors can be distinguished:

In case a threshold value for a signal strength or signal quality of the source radio cell is received by the mobile terminal as handover execution condition, the mobile terminal determines whether or not the respective signal strength or signal quality of the source radio cell falls below the received threshold value. Upon the respective signal strength or signal quality of the source radio cell having fallen below the received threshold value, the mobile terminal is to trigger execution of the handover to the target base station.

In case a threshold value for a signal strength or signal quality of the target radio cell is received by the mobile terminal as handover execution condition, the mobile terminal determines whether or not the respective signal strength or signal quality of the target radio cell rises above the received threshold value. Upon the respective signal strength or signal quality of the target radio cell having risen above the received threshold value, the mobile terminal is to trigger execution of the handover to the target base station.

Further, in case threshold values for a signal strength or signal quality of the source radio cell and the target radio cell are received by the mobile terminal as handover execution condition, the mobile terminal determines whether or not the respective signal strength or signal quality of the source radio cell falls below the received threshold value and, at the same time, whether or not the respective signal strength or signal quality of the target radio cell rises above the received threshold value. Upon the respective signal strength or signal quality of the source radio cell having fallen below and the respective signal strength or signal quality of the target radio cell having risen above the received threshold values, the mobile terminal is to trigger execution of the handover to the target base station.

According to an exemplary realization, the mobile terminal is to determine whether or not the signal strength corresponds to a threshold value for the reference signal received power, RSRP, to be measured by the mobile terminal based on reference signals, RSs, transmitted in the source and/or target radio cell. Alternatively, the mobile terminal is to determine whether or not the signal quality corresponds to a threshold value for the reference signal received quality, RSRQ, to be measured by the mobile terminal based on reference signals, RSs, transmitted in the source and/or target radio cell.

Third Implementation

According to a third implementation of the first embodiment, the handover execution condition corresponds to a counter value for out-of-sync events where a channel quality of the source radio cell falls below a preconfigured out-of-sync threshold. This third implementation makes use of a radio link, RL, monitoring process included in the mobile terminal. An exemplary realization of the handover command message according to the third implementation is shown in FIG. 13c.

In response to the receipt of a counter value for out-of-sync events included in the handover command message as handover execution condition, the mobile terminal determines whether or not the number of out-of-sync events which are reported by the RL monitoring process for a predefined period of time exceeds the received counter value. Upon the number of reported out-of-sync events exceeding the received counter value for the predefined period of time, the mobile terminal is to trigger execution of the handover to the target base station. The separation between handover procedure and RL monitoring process is exemplarily detailed in FIG. 14.

In summary, the above three implementations of the first embodiment all enable the mobile terminal to determine whether or not it is to execute handover to the target base station at a point in time which is different (i.e. later) than the point in time when the mobile terminal receives the handover command message. In this respect, in all three implementations the handover to the target base station may be delayed/deferred up to a point in time where reception of the handover command message would no longer be possible.

Exemplarily, the handover command message may be implemented as an RRC message, namely the RRCConnectionReconfiguration message, which is defined as follows:

```
RRCConnectionReconfiguration-r8-IEs ::= SEQUENCE {
    measConfig                    MeasConfig
                                      OPTIONAL, -- Need ON
    mobilityControlInfo           MobilityControlInfo
                                      OPTIONAL, -- Cond HO
    dedicatedInfoNASList          SEQUENCE (SIZE(1..maxDRB)) OF
                                      DedicatedInfoNAS
                                      OPTIONAL, -- Cond nonHO
    radioResourceConfigDedicated  RadioResourceConfigDedicated
                                      OPTIONAL, -- Cond HO-toEUTRA
    securityConfigHO              SecurityConfigHO
                                      OPTIONAL, -- Cond HO
    nonCriticalExtension          RRCConnectionReconfiguration-v890-
IEs
                                      OPTIONAL -- Need OP
}
```

Further, the handover execution condition included in the handover command message may be implemented as part of the mobilityControlInformation, as specified in the following:

```
MobilityControlInfo ::=              SEQUENCE {
    targetPhysCellId                    PhysCellId,
    carrierFreq                         CarrierFreqEUTRA
    carrierBandwidth                    CarrierBandwidthEUTRA
                                            OPTIONAL, -- Cond HO-
toEUTRA
    additionalSpectrumEmission          AdditionalSpectrumEmission
                                            OPTIONAL, -- Cond HO-
toEUTRA
    t304                                    ENUMERATED {
                                        ms50, ms100, ms150, ms200, ms500,
                                        ms1000,ms2000, spare1},
    newUE-Identity                      C-RNTI,
    radioResourceConfigCommon           RadioResourceConfigCommon,
    rach-ConfigDedicated                RACH-ConfigDedicated
                                            OPTIONAL, -- Need OP ...,
    [[ carrierFreq-v9e0                 CarrierFreqEUTRA-v9e0
                                            OPTIONAL -- Need ON
    ]],
    [[ drb-ContinueROHC-r11             ENUMERATED {true}
                                            OPTIONAL -- Cond HO
    ]]
    executionConditionValidityTimer         ENUMERATED {
                                        ms0, ms100, ms500, ms1000,
                                        ms2000, ms4000, ms5000, spare1},
                                            (OPTIONAL),
    executionCondition                  CHOICE{
        timeToExecute                       ENUMERATED {ms0, ms100, ms500,
                                        ms1000,ms2000, ms4000, ms5000,
                                        spare1},(OPTIONAL),
```

| | |
|---|---|
| radioCondition | SEQUENCE { |
| sourceCellQuality | ReportConfigEUTRA, (OPTIONAL), |
| targetCellQuality | ReportConfigEUTRA, (OPTIONAL), |
| | }, (OPTIONAL), |
| n310-r9 | ENUMERATED {n1, n2, n3, n4, n6, n8, n10, n20} (OPTIONAL), |
| } (OPTIONAL) | |

Accordingly, the mobilityControlInformation included in the RRCConnectionReconfiguration message includes three fields, i.e. timeToExecute, radioCondition, and n310-r9, among which, upon generation of the message, the target base station chooses one field to implement in the message to the mobile terminal.

The data field named timeToExecute may include the timer value as defined in the first implementation. The data field(s) named radioCondition including sourceCellQuality and/or targetCellQuality may include respective threshold value(s) as defined in the second implementation. The data field named n310-r9 may include the counter value for out-of-sync events as defined in the third implementation.

Further Implementation

According to a further implementation of the first embodiment, the mobile terminal varies the random access channel, RACH, procedure to be performed as part of execution of the handover to the target base station based on the point in time when the execution of the handover is triggered. Specifically, the mobile terminal distinguishes between an execution of the handover that is triggered before or after a second pre-configured period of time.

As commonly known, in 3GPP LTE there are two different RACH procedures defined, namely a contention-free RACH procedure and a contention-based RACH procedure. In the two RACH procedures the mobile terminal utilizes random access preambles from different groups for time aligning the uplink carrier of the (e.g. target) radio cell.

In the contention-free RACH procedure, the mobile terminal is assigned a unique random access preamble from a first group and can later thereby be identified by the (e.g. target) base station. In this respect, the (e.g. target) base station allocates the random access preamble from the first group to the mobile terminal for it to subsequently perform the contention-free RACH procedure. Conventionally, the allocated random access preamble is signaled to the mobile terminal as part of the handover command message.

In the contention-based RACH procedure, the mobile terminal randomly selects a random access preamble from a second group (which is distinct from the first group). As there may be more than one mobile terminal randomly selecting a same random access preamble, contention can occur and a lengthy mechanism of contention-resolution has to be carried out to enable the mobile terminal time aligning the uplink carrier and to receive the grant to send further UL signaling/data.

In this further implementation, in case the mobile terminal determines, within a second pre-configured period of time, that it is to trigger execution of the handover to the target base station, the mobile terminal executes the handover to the target base station including performing a contention-free RACH procedure based on a random access preamble included in the handover command message.

Alternatively, in this further implementation, in case the mobile terminal determines, after expiry of the second pre-configured period of time, that it is to trigger execution of the handover to the target base station, the mobile terminal executes the handover to the target base station including performing a contention-based RACH procedure based on a random access preamble randomly selected by the mobile terminal.

Advantageously, this further implementation enables the (e.g. target) base station to reduce the resource allocation demands in the sense that random access preambles (and associated RACH resources) are only uniquely assigned to mobile terminals for a limited amount of time, namely for the second pre-configured period of time. After elapse of the second pre-configured period of time the (e.g. target) base station is given the opportunity to reassign the same random access preamble to a different mobile terminal. In this respect, the time between subsequent assignments of contention-free random access preambles can be improved.

As can be readily appreciated, the further implementation should not be understood in the sense that it is limited to the first embodiment, namely to handover commands messages including handover execution conditions, only. There might be various other scenarios in which the mobile terminal receives a handover command message (i.e. without handover execution condition) but is not immediately capable of performing the contention-free RACH procedure. In these scenarios, a second pre-configured period of time would allow for the same advantage noted above.

According to a modification of the above noted further implementation, the received handover command message includes an RACH validity timer based on which the second pre-configured period of time may be set. Moreover, upon reception of a handover command message including the RACH validity timer by the mobile terminal, it is adapted to re-configure the second pre-configured period of time based on the received RACH validity timer.

According to an even further implementation of the first embodiment, further mechanisms shall be defined in response to which the mobile terminal discards the received handover command message.

Firstly, the handover command message may, as part of the handover execution condition, include a further threshold value for the signal strength or signal quality of the source radio cell, where, upon the mobile terminal determining that the respective signal strength or signal quality of the source radio cell rises above this further configured threshold values, the mobile terminal immediately discards the received handover command message (i.e. it does not wait for expiry of the first pre-configured period of time or the handover validity timer).

Secondly, in case the mobile terminal is (e.g. still) performing the determination step based on a receive handover execution condition included in an old handover command message, and at the same time receives a new (e.g. fresh) handover command message, the mobile terminal also immediately discards the old handover command message and starts the method for performing the handover based on the new received handover command message.

Second Embodiment

Figure 15:
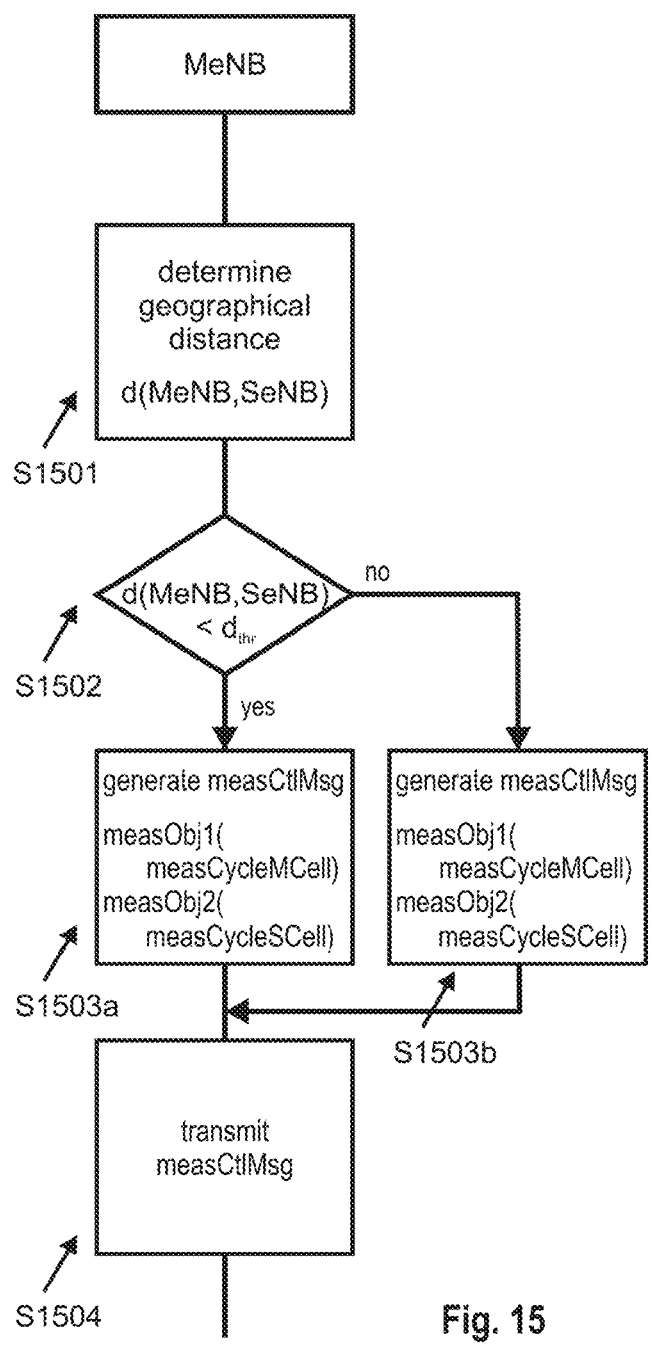
FIG. 15 shows a sequence diagram of the second embodiment of the invention.

Referring now to the second embodiment of the invention, various implementations of improved configurations of measurement cycles are to be discussed in connection with FIGS. 15 to 16. Specifically, FIG. 15 illustrates a sequence diagram of the configuration of measurement cycles of a mobile terminal by a master base station.

In the context of the second embodiment it is assumed that the mobile terminal, for which the measurement cycles are configured by the master base station, is connected via a macro radio cell to the master base station and via a small radio cell to the secondary base station.

For configuration of the measurement cycles, the master base station, according to the second embodiment, determines (c.f. Step S1501 in FIG. 15) a geographical distance between the master base station and the secondary base station both serving the mobile terminal. As already pointed out at the beginning of the detailed description, the term path loss may be used as an equivalent to the term geographical distance.

Figure 16:
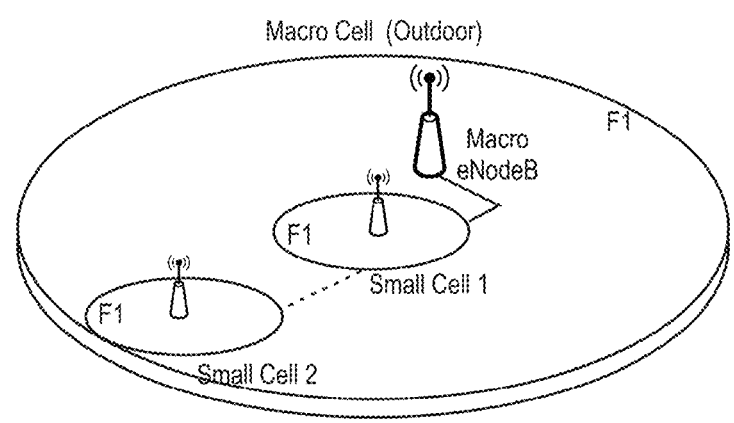
FIG. 16 illustrates an exemplary deployment scenario considered in connection with the second embodiment of the invention.

For instance in FIG. 16, an exemplary deployment scenario of a master base station (macro cell) and two secondary base stations (small cell 1 and 2) is illustrated, where one secondary base station (small cell 1) is located at a small geographical distance from the master base station (i.e. close to the center of the macro radio cell). Another secondary base station (small cell 2) is located at a large geographical distance from the master base station (i.e. at the perimeter of macro radio cell).

Then, the master base station compares (c.f. step S1502 in FIG. 15) the determined geographical distance to a pre-configured distance threshold. The distance threshold is pre-configured such that a mobile terminal, being connected to the master and the secondary base station, experiences the same or similar signal properties with respect to the master and the secondary base station. In other words, based on the pre-configured threshold it can be ensured that in case a mobile terminal is connected via the small radio cell to the secondary base station it will not loose coverage by the macro radio cell.

Subsequently, the master base station generates (c.f. step S1503a or S1503b in FIG. 15) a measurement control message for the mobile terminal including a first measurement object indicating a measurement cycle for the macro radio cell and a second measurement object indicating a measurement cycle for the small radio cell. This measurement control message is thereafter transmitted (c.f. step S1504 in FIG. 15) by the master base station to the mobile terminal for configuring measurement cycles of the mobile terminal.

In particular, in the second embodiment, the measurement cycle within the transmitted first measurement object for the macro radio cell is set by the master base station based on a result of the comparison of the determined geographical distance to the pre-configured distance threshold. Accordingly, in case the master base station determines the master and the secondary base stations to be at close geographical distance, i.e. below the pre-configured distance threshold, the master base station allows (c.f. step S1503a in FIG. 15) the mobile terminal to artificially prolong the measurement cycle for the macro radio cell (i.e. measurements are carried out at exceptionally long intervals).

Similarly, in case the master base station does not determine the master and the secondary base stations to be at close geographical distance, i.e. below the pre-configured distance threshold, the master base station also generates a measurement control message (c.f. step S1503b in FIG. 15) however, it does not allow the mobile terminal to artificially prolong the measurement cycle for the macro radio cell (i.e. measurements are carried out at exceptionally long intervals).

Due to artificially lengthy measurement cycles for the macro radio cell, the power consumption in the mobile terminal can be reduced. In particular, in case of dual connectivity where the mobile terminal is offloaded to the secondary radio cell (i.e. small cell offloading situation), the mobile terminal does not have to continue with measurements for the macro radio cell at regular intervals but can configure a prolonged measurement cycle for the macro radio cell.

In other words, conventionally the measurement cycle is set for any radio cell so that a mobile terminal does not lose coverage thereby. In this respect a prolonged measurement cycle would result in the risk of losing coverage by the respective radio cell. In contrast thereto, the information that the master and secondary base station have a geographical distance being smaller than the pre-configured distance threshold is utilized by the master base station for enabling a prolonged measurement cycle for the macro radio cell without risk of losing coverage thereby.

Referring back to the exemplary deployment scenario illustrated in FIG. 16, when a mobile terminal is located at close proximity to the secondary base station (small cell 1), the master base station determines that same secondary and the master base station are located at a geographical distance which is smaller than the pre-configured threshold value. In this situation, the master base station generates and transmits to the mobile terminal a measurement control message indicating a regular measurement cycle for the small radio cell and a prolonged measurement cycle for the macro radio cell.

Further, when the mobile terminal moves to a location where it is at close proximity to the other secondary bases station (small cell 2), the master base station determines that the other secondary and the master base station are not located at a geographical distance which is smaller that the pre-configured threshold value. In this respect, the master base station does not generate and transmit to the mobile terminal a measurement control message indicting a prolonged measurement cycle for the macro radio cell.

First Implementation

According to a first implementation of the second embodiment, in case the result of the comparison indicates that the determined geographical distance is smaller than the pre-configured distance threshold, the master base station sets the measurement cycle for the macro radio cell to a value which indicates measurement relaxation to the mobile terminal. Alternatively, the master base station sets the measurement cycle for the macro radio cell to a value which corresponds to more than 5 measurement cycles of the small radio cell. As another alternative, the mobile terminal sets the measurement cycle for the macro radio cell to a value which indicates deactivation of the measurements.

In all three cases, the mobile terminal does not have to continue with measurements for the macro radio cell at regular intervals but can configure a prolonged measurement cycle for the macro radio cell, thereby reducing the power consumption by the mobile terminal.

Second Implementation

With respect to the determination of the geographical distance between the master and and the secondary base station, according to a second implementation of the second embodiment, the master base station looks up the geographical position of the secondary base station from a location information table stored in the master base station. Alternatively, the master base station receives from the secondary base station location information indicating the geographical position thereof. As another alternative, the master base station measures the signal strength of reference signals that are transmitted by the secondary base station via the small radio cell.

In these three alternatives, the master base station is provided with information on the geographical distance between the master and the secondary base station and hence may use this information in the subsequent configuration of measurement cycles of the mobile terminal.

Alternatively, the mobile station may be configured to determine the geographical distance based on received measurement reports from the one or from plural mobile terminal(s) in dual connectivity with the master and the secondary base station. The measurement reports indicate signal strengths of reference signals that are transmitted by the secondary base station via the small radio cell and indicating signal strengths of reference signals that are transmitted by the master base station via the macro radio cell. In this respect, the master base station may determine whether or not the secondary base station is located under coverage by the macro radio cell (e.g. reference reports indicate similar signal strengths). Alternatively, the master base station may determine the geographical distance by the master base station measuring a round-trip-time for information transmitted to and received from the secondary base station. In these later two alternatives an approximated geographical distance between the master and the secondary base station is determined.

In any case variations of the first implementation and second implementation may be combined with each other to arrive at a configuration of measurement cycles of a mobile terminal which provides for the advantages named above.

Hardware and Software Implementation of the Invention

Another embodiment of the invention relates to the implementation of the above described various embodiments using hardware and software. In this connection the invention provides an user equipment (mobile terminal) and an eNodeB (base station). The user equipment is adapted to perform the methods described herein.

It is further recognized that the various embodiments of the invention may be implemented or performed using computing devices (processors). A computing device or processor may, for example, be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. An integrated circuit for controlling a communication apparatus for performing a handoff to a target base station, the integrated circuit comprising:

receiving circuitry, which, in operation, receives a handoff command message, for the handoff to the target base station, including a handoff execution condition; and control circuitry, which, in operation, determines, based on the received handoff execution condition included in the handoff command message, whether or not the communication apparatus is to trigger execution of the handoff to the target base station, wherein, in case the control circuitry determines that the communication apparatus is to trigger execution of the handoff to the target base station, the communication apparatus executes the handoff to the target base station (a) by performing a random access channel (RACH) procedure with the target base station, and (b) by transmitting to the target base station a handoff complete message after synchronizing to the target base station for communication with the target base station via a target radio cell, wherein the handoff execution condition, included in the received handoff command message, corresponds to an indication to trigger execution of the handoff based on threshold values for signal strength or signal quality of a source radio cell and/or the target radio cell, wherein the control circuitry, in operation, determines whether or not the signal strength or signal quality of the source radio cell falls below one of the threshold values and/or the signal strength or signal quality of the target radio cell rises above another of the threshold values, and wherein, upon the signal strength or signal quality having fallen below the one of the threshold values and/or having risen above the another of the threshold values, the communication apparatus is to trigger execution of the handoff to the target base station.

2. The integrated circuit according to claim 1, wherein the communication apparatus, prior to receiving the handoff command message, communicates with a source base station via the source radio cell; and the receiving circuitry, in operation, receives the handoff command message from the source base station via a downlink carrier of the source radio cell; and, after receiving the handoff command message, the communication apparatus detaches from the source radio cell whereby communication with the source base station is stopped.

3. The integrated circuit according to claim 1, wherein the handoff execution condition, included in the received handoff command message, corresponds to a timer value, and the control circuitry, in operation, determines whether or not a timer with the timer value has expired, and wherein, upon expiration of the timer with the timer value, the communication apparatus is to trigger execution of the handoff to the target base station.

4. The integrated circuit according to claim 1, wherein the handoff execution condition, included in the received handoff command message, corresponds to at least one threshold value for the signal strength or signal quality of the source and/or target radio cell, and the control circuitry, in operation, determines whether or not the signal strength or signal quality of the source radio cell falls below the at least one threshold value and/or the signal strength or signal quality of the target radio cell rises above the at least one threshold value, and wherein, upon the signal strength or signal quality having fallen below the at least one threshold value and/or having risen above the at least one threshold value, the communication apparatus is to trigger execution of the handoff to the target base station.

5. The integrated circuit according to claim 4, wherein the at least one threshold value for the signal strength corresponds to a threshold value for a reference signal received power (RSRP) to be measured by the communication apparatus based on reference signals (RSs) transmitted in the source and/or target radio cell, and the at least one threshold value for the signal quality corresponds to a threshold value for a reference signal received quality (RSRQ) to be measured by the communication apparatus based on the reference signals (RSs) transmitted in the source and/or target radio cell.

6. The integrated circuit according to claim 1, wherein the handoff execution condition, included in the received handoff command message, corresponds to an indication to trigger execution of the handoff based on out-of-sync events where a channel quality of the source radio cell falls below an out-of-sync threshold (Qout), and the control circuitry, in operation, determines whether or not a number of out-of-sync events exceeds a pre-configured number N, and wherein, in case the number of out-of-sync events exceeds the pre-configured number N, the communication apparatus is to trigger execution of the handoff to the target base station.

7. The integrated circuit according to claim 1, wherein the handoff execution condition, included in the received handoff command message, corresponds to a counter value for out-of-sync events where a channel quality of the source radio cell falls below an out-of-sync threshold (Qout), and the control circuitry, in operation, determines whether or not a number of out-of-sync events exceeds a received counter value, and wherein, in case the number of out-of-sync events exceeds the received counter value, the communication apparatus is to trigger execution of the handoff to the target base station.

8. The integrated circuit according to claim 1, wherein the handoff command message corresponds to a RRCConnectionReconfiguration message.

9. The integrated circuit according to claim 1, wherein the handoff complete message corresponds to a RRCConnectionReconfigurationComplete message.

10. The integrated circuit according to claim 1, wherein:
in case the control circuitry determines, within a second pre-configured period of time, that the communication apparatus is to trigger execution of the handoff to the target base station, the communication apparatus executes the handoff to the target base station including (a) performing a contention-free RACH procedure based on a random access preamble included in the handoff command message; and
in case the control circuitry determines, after expiry of the second pre-configured period of time, that the communication apparatus is to trigger execution of the handoff to the target base station, the communication apparatus executes the handoff to the target base station including (a) performing a contention-based RACH procedure based on a random access preamble randomly selected by the communication apparatus.

11. The integrated circuit according to claim 10, wherein the received handoff command message includes a RACH validity timer, and the control circuitry, in operation, re-configures the second pre-configured period of time based on the RACH validity timer.

* * * * *